(12) United States Patent
Hu et al.

(10) Patent No.: US 12,655,526 B2
(45) Date of Patent: Jun. 16, 2026

(54) Fe—N—C CATALYST, METHOD OF PREPARATION AND USES THEREOF

(71) Applicant: GAZNAT SA, Lausanne (CH)

(72) Inventors: Xile Hu, Saint-Prex (CH); Jun Gu, Lausanne (CH)

(73) Assignee: GAZNAT SA, Lausanne (CH)

( * ) Notice: Subject to any disclaimer, the term of this patent is extended or adjusted under 35 U.S.C. 154(b) by 806 days.

(21) Appl. No.: 16/968,898

(22) PCT Filed: Feb. 12, 2019

(86) PCT No.: PCT/EP2019/053403
§ 371 (c)(1),
(2) Date: Aug. 11, 2020

(87) PCT Pub. No.: WO2019/158516
PCT Pub. Date: Aug. 22, 2019

(65) Prior Publication Data
US 2021/0047741 A1 Feb. 18, 2021

(30) Foreign Application Priority Data

Feb. 13, 2018 (EP) ..................................... 18156529
Sep. 7, 2018 (EP) ..................................... 18193304

(51) Int. Cl.
*C01B 32/40* (2017.01)
*B01J 29/04* (2006.01)
(Continued)

(52) U.S. Cl.
CPC .............. *C25B 1/00* (2013.01); *B01J 29/048* (2013.01); *B01J 37/082* (2013.01); *C01B 32/40* (2017.08); *C25B 11/091* (2021.01)

(58) Field of Classification Search
CPC ............................ B01J 31/181; B01J 31/1691
See application file for complete search history.

(56) References Cited

U.S. PATENT DOCUMENTS 3,161,598 A * 12/1964 Geld ........................ C23G 1/04
252/387
3,459,658 A * 8/1969 Langlois ................ C10G 17/04
208/252
(Continued)

FOREIGN PATENT DOCUMENTS

CN 103483360 A * 1/2014
CN 106669765 A 5/2017
(Continued)

OTHER PUBLICATIONS

Wang et al, "Directly converting Fe-doped metal-organic frameworks into highly active and stable Fe—N—C catalysts for oxygen reduction in acid", Nov. 22, 2016, Nano Energy, 25, 110-119. (Year: 2016).*

(Continued)

*Primary Examiner* — Luan V Van
*Assistant Examiner* — Andrew Koltonow
(74) *Attorney, Agent, or Firm* — SALIWANCHIK, LLOYD & EISENSCHENK

(57) ABSTRACT

The invention relates to single-atom Fe catalysts useful for the electrochemical reduction of carbon dioxide, method of preparation as uses thereof. In particular, the invention relates to a method of preparation of Fe(II) doped Zn-ZIF precursor material and use thereof in the preparation of a catalyst containing Fe single atoms on N doped carbon matrix derived from the pyrolysis of this Fe(II) doped Zn-ZIF precursor material.

20 Claims, 16 Drawing Sheets

(51) Int. Cl.
  *B01J 37/08* (2006.01)
  *C25B 1/00* (2021.01)
  *C25B 11/091* (2021.01)

(56) References Cited

U.S. PATENT DOCUMENTS

2017/0113205 A1* 4/2017 Garcia ................. B01J 20/2808
2017/0361299 A1* 12/2017 Brunelli .................. B01F 25/23
2018/0326398 A1* 11/2018 Nair ..................... B01D 71/028

FOREIGN PATENT DOCUMENTS

CN       107086313       8/2017
CN       116059968 B  *  9/2024   ............. B01D 53/02

OTHER PUBLICATIONS

Zhu et al, "Growth of zeolitic imidazolate framework-8 crystals from the solid-liquid Interface", Mar. 6, 2012, Journal of Materials Chemistry, 22, 7684-7686 (2012)) (Year: 2012).*

Wang, X. et al. "Directly converting Fe-doped metal-organic frameworks into highly active and stable Fe—N—C catalysts for oxygen reduction in acid" *Nano Energy*, available online Apr. 27, 2016, pp. 110-119, vol. 25.

Chen, Y. et al. "Aqueous $CO_2$ Reduction at Very Low Overpotential on Oxide-Derived Au Nanoparticles" *J. Am. Chem. Soc.*, 2012, pp. 19969-19972, vol. 134.

Chen, Y. et al. "Isolated Single Iron Atoms Anchored on N-Doped Porous Carbon as an Efficient Electrocatalyst for the Oxygen Reduction Reaction" *Angew. Chem. Int. Ed.*, 2017, pp. 1-6, vol. 56.

Gu, J. et al. "Atomically dispersed $Fe^{3+}$ sites catalyze efficient $CO_2$ electroreduction to CO" *Science*, Jun. 14, 2019, pp. 1-4, vol. 364.

Huan, T. N. et al. "Electrochemical Reduction of $CO_2$ Catalyzed by Fe—N—C Materials: A Structure-Selectivity Study" *ACS Catal.* 2017, pp. 1520-1525, vol. 7.

Jhong, H.-R. M. et al. "Electrochemical conversion of $CO_2$ to useful chemicals: current status, remaining challenges, and future opportunities" *Current Opinion in Chemical Engineering*, 2013, pp. 191-199, vol. 2.

Jones, J.-P. et al. "Electrochemical $CO_2$ Reduction: Recent Advances and Current Trends" *Isr. J. Chem.*, 2014, pp. 1451-1466, vol. 54.

Li, C.W. et al. "$CO_2$ Reduction at Low Overpotential on Cu Electrodes Resulting from the Reduction of Thick $Cu_2O$ Films" *J. Am. Chem. Soc.*, 2012, pp. 7231-7234, vol. 134.

Li, Q. et al. "Tuning Sn-Catalysis for Electrochemical Reduction of $CO_2$ to CO via the Core/Shell $Cu/SnO_2$ Structure" *J. Am. Chem. Soc.*, 2017, pp. 4290-4293, vol. 139.

Liu, M. et al. "Enhanced electrocatalytic $CO_2$ reduction via field-induced reagent concentration" *Nature*, Sep. 15, 2016, pp. 382-386, vol. 537, Methods pp. 1-13.

Lu, Q. et al. "A selective and efficient electrocatalyst for carbon dioxide reduction" *Nature Communications*, Jan. 2014, pp. 1-6, vol. 5, No. 3242.

Park, K.S. et al. "Exceptional chemical and thermal stability of zeolitic imidazolate frameworks" *PNAS*, Jul. 5, 2006, pp. 10186-10191, vol. 103, No. 27, supporting appendix pp. 1-111.

Phan, A. et al. "Synthesis, Structure, and Carbon Dioxide Capture Properties of Zeolitic Imidazolate Frameworks" *Accounts of Chemical Research*, Jan. 2010, pp. 58-67, vol. 43, No. 1.

Won, D.H. et al. "Highly Efficient, Selective, and Stable $CO_2$ Electroreduction on a Hexagonal Zn Catalyst" *Angew. Chem. Int. Ed.*, 2016, pp. 9297-9300, vol. 55.

Ye, Y. et al. "Two-step pyrolysis of ZIF-8 functionalized with ammonium ferric citrate for efficient oxygen reduction reaction" *Journal of Energy Chemistry*, 2017, pp. 1174-1180, vol. 26.

Zhang, X. et al. "Highly selective and active $CO_2$ reduction electrocatalysts based on cobalt phthalocyanine/carbon nanotube hybrid structures" *Nature Communications*, Mar. 2017, pp. 1-8, vol. 8, No. 14675.

Zhao, S.-N. et al. "Highly efficient heterogeneous catalytic materials derived from metalorganic framework supports/precursors" *Coordination Chemistry Reviews*, 2017, pp. 80-96, vol. 337.

Zhu, W. et al. "Active and Selective Conversion of $CO_2$ to CO on Ultrathin Au Nanowires" *J. Am. Chem. Soc.*, 2014, pp. 16132-16135, vol. 136.

Zhu, D.D. et al. "Recent Advances in Inorganic Heterogeneous Electrocatalysts for Reduction of Carbon Dioxide" *Adv. Mater.*, 2016, pp. 3423-3452, vol. 28.

Written Opinion in International Application No. PCT/EP2019/053403, Mar. 14, 2019, pp. 1-6.

* cited by examiner

Fe(II) doped ZIF-8 $\xrightarrow[\text{in } N_2]{900\ ^\circ\text{C, 3 h}}$ Fe-N-C (II)

(7)                                        (8)

(a) Providing a Fe(II)-doped ZIF-8 in dried form (7)

b) Subjecting said Fe(II)-doped ZIF-8 (7) to a pyrolysis at about 900 °C under inert atmosphere during about 3 hours b) Collecting the obtained a pyrolysis product (8)

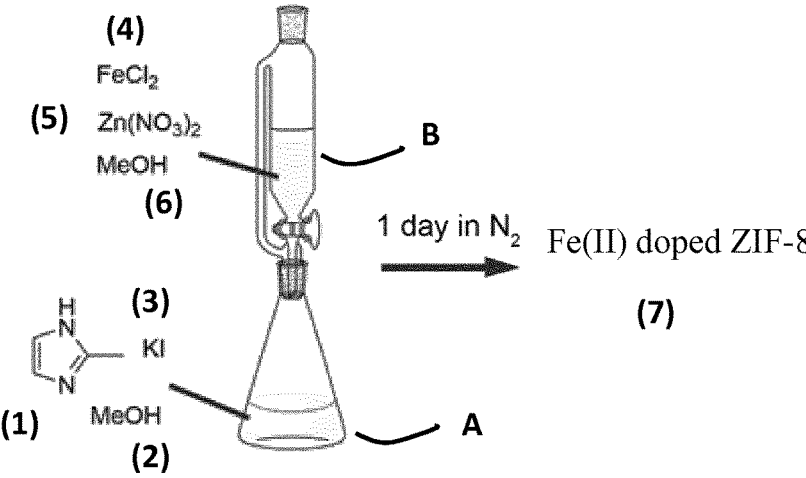

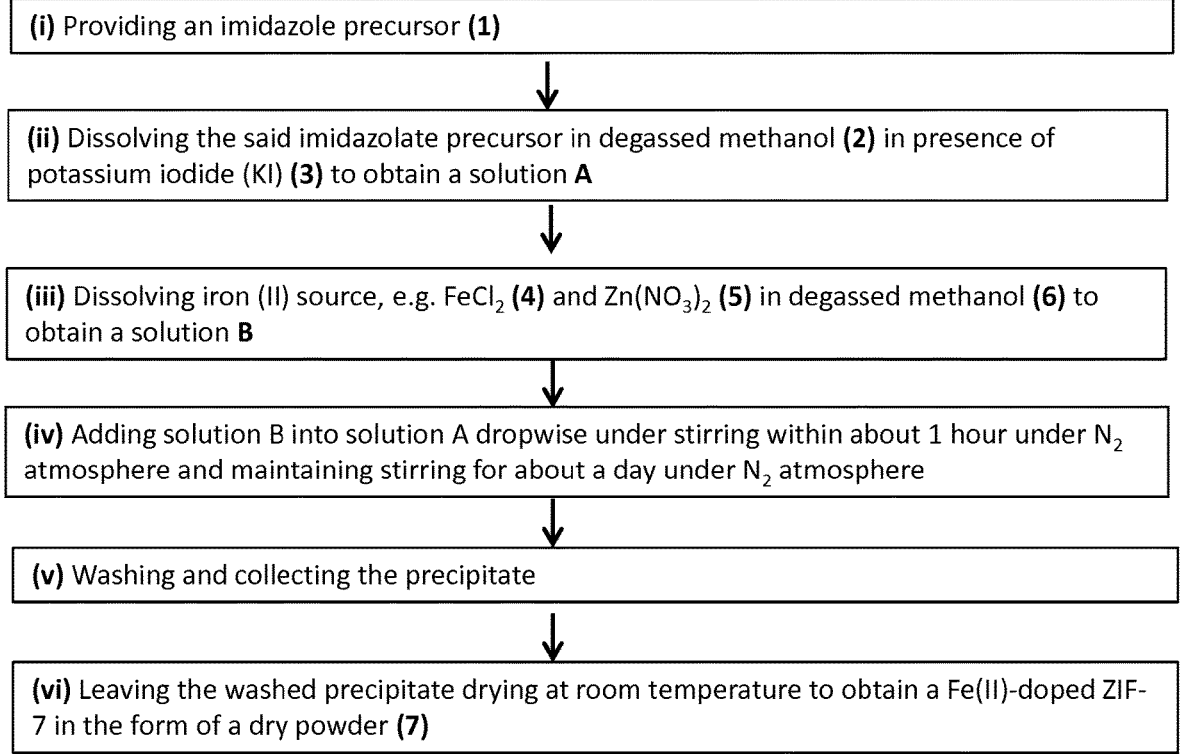

(i) Providing an imidazole precursor (1)

(ii) Dissolving the said imidazolate precursor in degassed methanol (2) in presence of potassium iodide (KI) (3) to obtain a solution A

(iii) Dissolving iron (II) source, e.g. FeCl$_2$ (4) and Zn(NO$_3$)$_2$ (5) in degassed methanol (6) to obtain a solution B

(iv) Adding solution B into solution A dropwise under stirring within about 1 hour under N$_2$ atmosphere and maintaining stirring for about a day under N$_2$ atmosphere (v) Washing and collecting the precipitate (vi) Leaving the washed precipitate drying at room temperature to obtain a Fe(II)-doped ZIF-7 in the form of a dry powder (7)

Figure 1B c d a b c a b c d

Fe—N—C CATALYST, METHOD OF PREPARATION AND USES THEREOF

CROSS-REFERENCE TO RELATED APPLICATION

This application is the U.S. national stage application of International Patent Application No. PCT/EP2019/053403, filed Feb. 12, 2019.

FIELD OF THE INVENTION

The present invention pertains generally to the fields of electrochemical reduction of carbon dioxide, in particular to catalysts for $CO_2$ electro-reduction.

BACKGROUND OF THE INVENTION

Atmospheric carbon dioxide ($CO_2$) levels rising has become a global concern with envisioned cascade of environmental consequences including damaging climate changes which could impact modern civilization. Since the amounts of $CO_2$ that have been produced in the last fifty years are considerable, multiple approaches need to be implemented in order to decrease those amounts. Among those, electrochemical reduction of $CO_2$ into useful chemicals including carbon monoxide (CO), formic acid, methane and ethylene have been developed (Jhong et al., 2013, *Current Opinion in Chemical Engineering*, 2(2), 191-199).

Therefore, electroreduction of $CO_2$ to CO in aqueous electrolyte is considered as a promising technique to convert $CO_2$ and electricity to CO and $O_2$, which immobilize $CO_2$, produce valuable chemical at the same time and will allow recycling spent $CO_2$ into a "carbon neutral" cycle.

Electrochemical reduction of $CO_2$ to form carbon-based fuels and chemicals has been widely proposed for the storage and utilization of intermittent renewable energies such as solar and wind (Zhu et al., 2016, *Adv Mater.*, 28(18), 3423-52). However, two major deficiencies have prevented $CO_2$ electroreduction from becoming a viable technology: energy inefficiency due to large overpotentials and poor selectivity leading to separation issues. If CO is the only product of $CO_2$ reduction, the product can be directly used in the synthesis of hydrocarbons (Fischer-Tropsch synthesis), methanol and aldehyde by feeding $H_2$ to a proper $CO:H_2$ ratio.

Over the past three decades, efforts have mostly focused on screening different metal catalysts and the various products that can be formed using those metals. Unfortunately, the conversion was often low (<20 mA/cm²) under overpotential lower than 400 mV and the selectivity for the desired product was also low.

Up to now, the most active catalysts for CO generation from $CO_2$ electroreduction are Au and Ag based nanomaterials (Chen et al., 2012, *J. Am. Chem. Soc.*, 134, 19969-19972; Zhu et al., 2014, *J. Am. Chem. Soc.*, 136, 16132-16135; Lu et al., 2014, *Nat. Commun.*, 5, 3242) and up to now, the most active two catalysts for CO generation from $CO_2$ electroreduction are (1) oxide derived Au (Chen et al., 2012, supra): at −0.4 V vs reversible hydrogen electrode (RHE), the generation rate of CO is 8 mA·cm⁻²; (2) Au needles electrode (Liu et al., 2016, *Nature*, 537, 328): at −0.35 V vs RHE, the current density of CO formation was about 14 mA·cm⁻². However, the high cost of this catalyst limits the large-scale usage. The performances of most non-noble metal catalysts, such as Cu and Zn, are much poorer (Li et al., 2012, *Am. Chem. Soc.*, 134, 7231-7234, Li et al., 2017, *J. Am. Chem. Soc.*, 139, 4290-4293; Won et al., 2016, *Angew. Chem. Int. Ed.*, 55, 9297-9300). Catalysts containing earth abundant metal like Fe, Co and Ni have been developed but the partial current densities are still lower than that on Au and Ag based catalysts. In particular, a commercial zeolitic imidazole framework (ZIF), ZIF-8, Fe(II) acetate (Fe(Ac)₂) and phenanthroline (phen) were used as precursors which were mixed by ball-milling before pyrolysis, leading to catalytic materials of various performance but all achieving a generation rate of CO much lower than Au catalyst, namely about 2 mA·cm⁻² at −0.4 V (Huan et al., 2017, *ACS Catal.*, 7, 1520). Iron, cobalt and nitrogen codoped carbon catalysts have been prepared through high-temperature pyrolysis of a Fe(II) doped Co-ZIF precursor, wherein said Fe(II) doped Co-ZIF precursor is prepared from cobalt 2-methylimidazole (ZIF-67) (CN 107086313). The resulting catalyst has been said to be useful in the fields of fuel batteries and metal-air batteries and to be superior to commercial catalyst Pt/C.

Catalysts useful for oxygen reduction reaction derived from precursors consisting in ZIF-8 functionalized with ammonium ferric salt (AFC) (AFC©ZIF-8) which are then subjected to a two-step pyrolysis have been described in Ye Yifan et al, 2017, *Journal of Energy Chemistry*, 26(6), 1174-1180. The second step pyrolysis is said to improve the mesoporous area and the formation of undesired iron nanoparticles. The precursors (AFC©ZIF-8) of the pyrolysis are prepared from AFC without the addition of reductant and therefore the precursor is a Fe(III) doped Zn-ZIF.

Therefore, $CO_2$ conversion through catalytic processes in a selective and efficient manner is of high interest and there is a high need for performant catalysts allowing achieving a cost-effective selective $CO_2$ conversion.

SUMMARY OF THE INVENTION

An object of this invention is to provide a catalyst material useful for the electroreduction of $CO_2$ to CO in aqueous electrolyte.

It is advantageous to provide a catalyst material having a high catalytic activity allowing increasing $CO_2$ electroreduction rates, while maintaining a high selectivity to CO formation.

It is advantageous to provide a catalyst material having a production cost that allows a large scale use.

It is advantageous to provide a catalyst material which is stable over time of use, thereby limiting the amounts of catalytic material to use per reduction process and avoiding the need of costly catalyst regeneration, which would reduce the overall production costs of the $CO_2$ electroreduction products.

It is advantageous to provide a catalyst that is made of abundant metals that allows a large scale use.

It is advantageous to provide a cost-effective method for the preparation of an efficient catalyst material useful for the electroreduction of $CO_2$ to CO in aqueous electrolyte.

It is advantageous to provide a cost-effective method for the preparation of an efficient catalyst material presenting a discrete reparation of Fe and Zn atoms within the structure of the catalyst.

It is advantageous to prepare a catalyst from readily available chemical reagents.

An object of this invention is to provide a method for the electroreduction of $CO_2$ to CO in aqueous electrolyte which is selective and cost effective.

Objects of this invention have been achieved by providing a use according to claim 1, a method according to claim 2 and a catalyst material according to claim 13.

Disclosed herein, according to a first aspect of the invention, is a use of a catalyst material containing Fe single atom on N doped carbon matrix prepared from a Fe(II)-doped Zn-zeolitic imidazole framework (ZIF) for the electroreduction of $CO_2$ to CO.

Disclosed herein, according to a second aspect of the invention, is a method for the preparation of a catalyst material comprising the steps of:

a) Providing a Fe(II)-doped Zn-zeolitic imidazole framework (ZIF) in dried form under inert atmosphere;

b) Subjecting said Fe(II)-doped Zn-ZIF to a pyrolysis under inert atmosphere during about 2 to about 24 hours, typically 3 hours;

c) Collecting the obtained pyrolysis product as a catalyst material.

The method may advantageously comprise providing a Fe(II)-doped Zn ZIF which is obtained by a method comprising the steps of:

(i) Providing an imidazole or imidazole derivate precursor;

(ii) Dissolving the said imidazole or imidazole derivate precursor in degassed polar solvent such as methanol or ethanol in a reductive environment to prevent the oxidization of $Fe^{2+}$ cations, for example in presence of a iodide derivative such as potassium, sodium or ammonium iodide (KI, or NaI or $NH_4I$), to obtain a solution A;

(iii) Dissolving an iron (II) precursor, such as $FeCl_2$ $FeCl_2\cdot4H_2O$, $Fe(CH_3COO)_2$, and a zinc salt such as $Zn(NO_3)_2$ or $ZnCl_2$, in degassed methanol degassed polar solvent such as methanol or ethanol to obtain a solution B;

(iv) Adding solution B into solution A;

(v) Collecting and washing the precipitate;

(vi) Leaving the washed precipitate drying at room temperature to obtain a Fe(II)-doped Zn-Zeolitic imidazole framework (ZIF) in the form of a dry powder, wherein steps (ii) to (iv) are conducted under stirring in an inert atmosphere;

(vii) Collecting the Fe(II)-doped Zn-zeolitic imidazole framework (ZIF) in the form of a dry powder under an inert atmosphere.

Disclosed herein, according to a third aspect of the invention, is a catalyst material comprising Fe single atoms on N doped matrix carbon derived from the pyrolysis of a Fe(II)-doped Zn-ZIF.

Disclosed herein, according to a further aspect of the invention, is a use of a catalyst material comprising Fe single atoms on N doped matrix carbon derived from the pyrolysis a Fe(II)-doped Zn-ZIF for the electroreduction of $CO_2$ to CO.

Disclosed herein, according to a further aspect of the invention, is a process for the electrochemical reduction of carbon dioxide to CO comprising the steps of:

Providing a electroreduction system for the electrochemical reduction of $CO_2$;

Providing a catalyst material comprising Fe single atoms on N doped matrix carbon according to the invention;

Contacting the said catalyst material with the working electrode of the electroreduction system;

Conducting the electroreduction reaction of $CO_2$ into CO;

Collecting the released gas containing CO, small amount of $H_2$ and unreacted $CO_2$.

Disclosed herein, according to a further aspect of the invention, is provided an electroreduction system or part of an electroreduction system (e.g. a support electrode) for the electrochemical reduction of $CO_2$ comprising a catalyst material according to the invention.

Disclosed herein, according to a further aspect of the invention, is a kit for use in the electroreduction of $CO_2$, comprising a catalyst material according to the invention.

Disclosed herein, according to a further aspect of the invention, is a kit for the preparation of a catalyst material according to the invention, the kit comprising a container comprising a Fe(II)—Zn-doped zeolitic imidazole framework (ZIF) in dry form and under inert atmosphere.

Disclosed herein, according to a further aspect of the invention, is a kit for the preparation of a Fe(II)-doped Zn-zeolitic imidazole framework (ZIF) suitable for use for the preparation of a catalyst material according to the invention, the kit comprising in separate compartments or containers:

a) an imidazole or imidazole derivate precursor;

b) an iodide derivative such as potassium, sodium or ammonium iodide (KI, or NaI or $NH_4I$);

c) an iron (II) precursor, such as $FeCl_2$ or $Fe(CH_3COO)_2$; and d) a zinc salt such as $Zn(NO_3)_2$ or $ZnCl_2$.

Other features and advantages of the invention will be apparent from the claims, detailed description, and figures.

DETAILED DESCRIPTION OF THE INVENTION

Figure 1A:
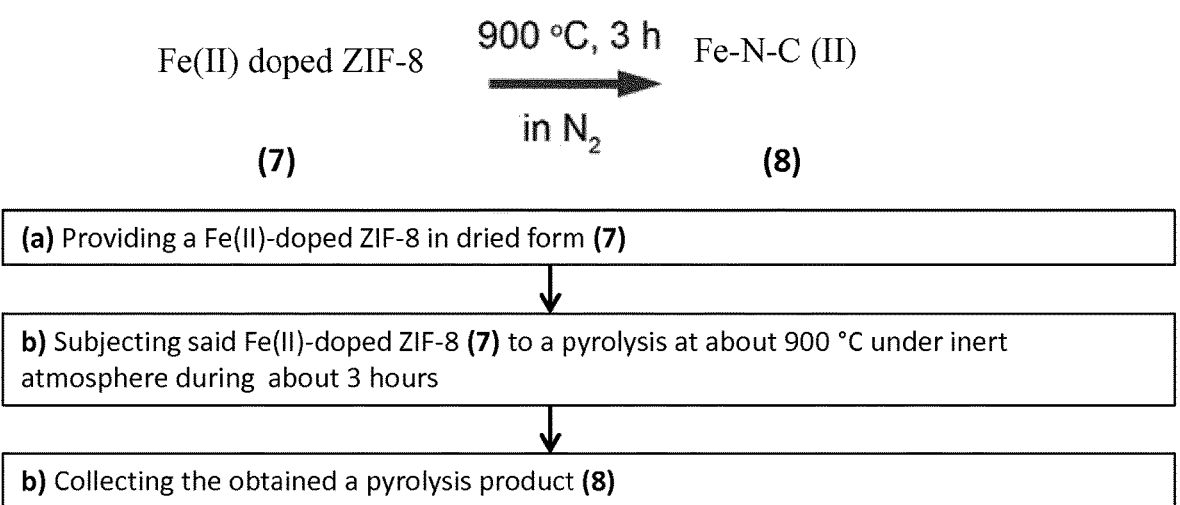
FIG. 1 illustrates a process for obtaining a catalyst material comprising Fe single atoms on N doped carbon matrix (Fe—N—C(II)) according to the invention (A) and a method for obtaining a Fe(II) doped Zn-ZIF-8 precursor according to the invention for this catalyst material (B).

Zeolitic imidazolate frameworks (ZIFs) are a sub-family of metal organic frameworks (MOFs) which can be synthesized by solvothermal/hydrothermal and microwave assisted reactions at temperatures in the 298-423 K range. ZIFs adopt porous crystalline structures composed of metal ions and organic linkers, ordered in an analogous fashion to that of silicon and oxygen in zeolites. The tetrahedral metal centers [e.g. M=Zn(II)] are solely coordinated by nitrogen atoms in the 1,3-positions of the imidazolate bridging ligand to give overall neutral frameworks. Imidazolate ligands are generally obtained with phenyl (benzimidazolate (PhIM)) or methyl (2-methylimidazolate (MeIM)) groups (Park et al., 2006, *PNAS*, 103(7), 10186-10191). ZIF-8, which can be easily synthesized at room temperature and stable in water, is a zeolite structure with tetrahedrally coordinated zinc metal and 2-methylimidazole rings (Zn(MeIM)$_2$)) and has a sodalite topology (SOD) exhibiting a 3D structure with cages of 11.6 A in diameter, which are accessible through 3.4 A windows. Zn sites in ZIF can be substituted by other divalent metal cations with tetragonal coordination mode such as $Fe^{2+}$ and $Co^{2+}$, and the inner space of ZIFs can accommodate complexes of other metal cations such as $Fe^{3+}$, $Ni^{2+}$ and $Cu^{2+}$. In the frame of the present invention, it has been unexpectedly found that, by using $Fe^{2+}$-doped zeolitic imidazole frameworks (ZIFs), in particular ZIF-8, as a precursor material for carrying a pyrolysis according to a process of the invention, a catalyst material containing Fe single atoms on N doped carbon matrix with $CO_2$ electroreduction performance similar to oxide derived Au catalyst can be obtained.

The performances of a catalyst can be measured through Faradaic efficiency (FE), partial current density of CO formation and stability (Jones et al., 2014, *Isr. J. Chem.* 54, 1451-1466). Typically, a catalyst having a Faradaic efficiency higher than 80% for applied potential more positive than –0.6 V vs RHE, a partial current density of CO formation higher than 10 mA·cm⁻², which indicates a generation rate of CO higher than 3.3 mL·h⁻¹·cm⁻² is considered as being a very efficient catalyst. The expression "an imidazole or imidazole derivate precursor" refers to a precursor of an imidazole precursor that is able to form an imidazole bridge with the tetrahedral metal ions within a zeolitic imidazolate framework structure. Examples of imidazole precursors are cited in Han et al., 2009, *Accounts of chemical research*, 43(1), 58-67 and Park et al., 2006, supra.

In particular, an imidazole or imidazole derivate precursor comprises 2-ethylimidazole, 2-methylimidazole, 4-nitroimidazole, 4,5-dichloronitroimidazole, imidazo late-2-Carboxylaldehyde, 4-cyanoimidazole, benzimidazole, methylbenzimidazole, 4-azabenzimidazole, 5-azabenzimidazole and purine.

The expression "iodide derivative" comprises potassium iodide, sodium iodide, ammonium iodide, tetramethylammonium iodide, tetraethylammonium iodide and tetrabutylammonium iodide.

The expression "an iron (II) precursor" refers to any iron (II) containing precursor suitable for doping a ZIF. Examples of iron (II) precursor according to the invention include dehydrate or hydrate $FeCl_2$, $FeSO_4$, $(NH_4)_2Fe(SO_4)_2.6H_2O$, $Fe(CH_3COO)_2$ and Fe(II) acetylacetonate.

The expression "Zn salt" refers to any Zn containing salt suitable for the preparation of a zeolitic imidazolate framework structure. Examples of a zinc salt according to the invention includes dehydrate or hydrate $Zn(NO_3)_2$, $ZnCl_2$, $ZnSO_4$, $Zn(ClO_4)_2$, $ZnBr_2$, $Zn(CH_3COO)_2$ and Zn acetylacetonate.

The expression "a reductive environment to prevent the oxidization of $Fe^{2+}$ cations" encompasses introducing reductive agents include $Na_2SO_3$, $K_2SO_3$, ascorbic acid and formaldehyde.

Referring to the figures, in particular first to FIG. 1A, is provided an illustration of a method for the preparation of a catalyst material containing Fe single atom on N doped matrix comprising the steps of:

a) Providing a Fe(II)-doped Zn-zeolitic imidazole framework (ZIF), for example a Fe(II)-doped ZIF-8 (7) in dried form under inert atmosphere;

b) Subjecting said Fe(II)-doped Zn-ZIF-8 to a pyrolysis under inert atmosphere during about 2 to about 24 hours;

c) Collecting the obtained pyrolysis product as a catalyst material.

In an embodiment, the Fe(II)-doped Zn-zeolitic imidazole framework (ZIF) is provide in dried form in $N_2$ atmosphere or immerged in hexane. Typically, a Fe(II)-doped Zn-zeolitic imidazole framework (ZIF) according to the invention is stable under inert atmosphere.

According to another further particular embodiment, the Fe(II)-doped Zn-zeolitic imidazole framework (ZIF) is provided on a support under inert atmosphere and the pyrolysis under step b) is carried our directly on said support.

In an embodiment, the pyrolysis under step b) is carried out for about 3 hours.

In an embodiment, the pyrolysis under step b) is carried out at a temperature between about 800 and 950° C., typically 900° C.

In another embodiment, the pyrolysis under step b) is carried out through the ramping of temperature at a rate of about 2 to 10° C. $min^{-1}$, for example 5° C. $min^{-1}$.

In another embodiment, the inert atmosphere is provided by a $N_2$ flow, e.g. with a flow rate of 50 to 150 mL·$min^{-1}$.

In another embodiment, Fe(II)-doped Zn-ZIF material according to the invention adopts the crystal structure of Zn ZIF-8 with some Zn(II) ions substituted with Fe(II) ions.

In another embodiment, the method for the preparation of a catalyst material according to the invention may advantageously comprise providing Fe(II)-doped ZIF material which is obtained by a method according to the invention.

Referring to FIG. 1B, is provided an illustration of a specific embodiment regarding steps of a method for preparing a Fe(II)-doped Zn-ZIF which is obtained by a method comprising the steps of:

(i) Providing an imidazole precursor, in particular a 2-methyl imidazole precursor (1);

(ii) Dissolving the said imidazole precursor in degassed polar solvent such as methanol (2) in presence of an iodide derivative such as potassium iodide (KI) (3) to obtain a solution A;

(iii) Dissolving an iron (II) precursor such as $FeCl_2$ (4) and a zinc salt such as $Zn(NO_3)_2.6H_2O$ (5) in degassed polar solvent such as methanol (6) to obtain a solution B;

(iv) Adding solution B into solution A;

(v) Collecting and washing the precipitate;

(vi) Leaving the washed precipitate drying at room temperature to obtain a Fe(II)-doped ZIF-8 (8) in the form of a dry powder, wherein steps (ii) to (vi) are conducted under stirring in an inert atmosphere;

(vii) Collecting the Fe(II)-doped Zn-zeolitic imidazole framework (ZIF) in the form of a dry powder under an inert atmosphere.

In another embodiment, the method for preparing a Fe(II)-doped Zn-ZIF comprises dissolving an iron (II) precursor and a zinc salt under step (iii) to obtain a solution B such that the molar ratio Fe to Zn is from about 1:20 to about 1:4, preferably not higher than 1:9.

In another embodiment, the method for preparing a Fe(II)-doped Zn-ZIF comprises adding solution B into solution A dropwise under stirring for about 1 hour.

In a further embodiment, the method for preparing a Fe(II)-doped Zn-ZIF comprises keeping the reacting mixture obtained under step (iv) under stirring under inert atmosphere for about one day after the completion of the addition of solution B.

In a further embodiment, the method for preparing a Fe(II)-doped Zn-ZIF comprises collecting the precipitate under step (v) by filtration at ambient pressure or centrifugation, under inert atmosphere.

In a further embodiment, the method for preparing a Fe(II)-doped Zn-ZIF comprises washing the precipitate under step (v) by washing the collected precipitate by a solvent sequence. According to a further particular embodiment, the washing is carried out by a solvent sequence comprising a washing with N,N-dimethylformamide (DMF) and a washing with methanol twice.

In another embodiment, the inert atmosphere is provided by a confined reaction space under inert atmosphere (e.g. glove box filled with $N_2$).

According to another embodiment, the Fe(II)-doped Zn-zeolitic imidazole framework (ZIF) of the invention collected in dry form under step (vii) can be stored for about 1 week in an air-protected atmosphere (e.g. under $N_2$ atmosphere or immerged in hexane) before conducting the pyrolysis.

In a further embodiment, the method for preparing a Fe(II)-doped Zn-ZIF further comprises a step (viii) of dispersing the dried precipitate obtained under step (vii) in hexane for storing it in an air-protected atmosphere, before subjecting it to pyrolysis.

In a particular embodiment, the Fe(II)-doped Zn-ZIF according to the invention is directly obtained or deposited on a support, for example on a support electrode (e.g. carbon cloth or carbon fibre paper).

According to a particular aspect, a method of the invention for the preparation of a Fe(II)-doped Zn-ZIF precursor advantageously allows the doping of the Fe(II) ions during the formation of the ZIF structure (under step (iv)) which leads, after pyrolysis to catalyst of improved $CO_2$ reduction performances compared to catalysts obtained from precursors simply resulting from the mixing of ZIF-8 and Fe(II) as described in Huan et al., 2017, supra. In a particular embodiment, a catalyst material containing Fe single atom on N doped carbon matrix prepared from a Fe(II)-doped Zn-zeolitic imidazole framework (ZIF) according to the invention is useful in a process of electroreduction of $CO_2$ to CO and can be usefully part of an electroreduction system for the electrochemical reduction of $CO_2$ and/or a kit for use in the electroreduction of $CO_2$.

According to a particular embodiment, a catalyst material according to the invention can be deposited on the surface of a working electrode of an electroreduction system.

According to a further particular embodiment, a catalyst material according to the invention can be deposited on a surface by spin coating, drop casting or by dip coating, spray coating. According to a particular embodiment, a catalyst material according to the invention can be mixed with a binding agent such as a resin or a polymer to adhere to the surface of use. Carbon nanotubes or carbon fibres may be added into the mixture to increase the strength of the deposit. For example, the deposit can be achieved by drying a solution of the catalyst, the binding agent and optionally carbon nanotubes or carbon fibres onto the desired surface.

According to another further particular embodiment, a catalyst material according to the invention can be coated or deposited on a surface of use, in particular on the surface of an electrode for or of an electroreduction system. More particularly, a mixture of the catalyst material and a binding agent can be pressed into a membrane electrode for use in an electroreduction system.

Alternatively and according to another further particular embodiment, a catalyst material according to the invention can be prepared through the pyrolysis of a Fe(II) doped Zn-ZIF-8 directly grown or deposited on a support, for example on a support electrode (e.g. carbon cloth or carbon fibre paper).

According to a further aspect of the invention, is a kit for use in the electroreduction of $CO_2$, comprising a catalyst material according to the invention, for example the kit comprises the catalyst in dry form in a container (e.g. vial, cartridge etc.) or as a deposit on a surface such as a support electrode.

According to a particular embodiment, is provided an electroreduction system or part of an electroreduction system (e.g. a support electrode) for the electrochemical reduction of $CO_2$ comprising a catalyst material according to the invention, for example a catalyst material in dry form in a container (e.g. vial, cartridge etc.) or as a deposit on a surface such as a support electrode of the electroreduction system.

According to a particular embodiment, an electroreduction system according to the invention is a three electrodes system (working electrode, counter electrode and reference electrode) using $KHCO_3$ or $NaHCO_3$ aqueous solution as electrolyte, saturated by $CO_2$ of 1 atm, under stirring.

According to a particular embodiment, the working electrode of an electroreduction system is a carbon cloth.

The invention having been described, the following examples are presented by way of illustration, and not limitation.

EXAMPLES

Example 1: Preparation of a Fe(II) Doped Zn-ZIF Precursor

A method of the invention for the preparation of a Fe(II)-doped Zn-zeolitic imidazole frameworks (ZIFs)

according to the invention is illustrated on FIG. 1B for a Fe(II) doped zinc imidazolate (ZIF-8). In order to prevent the oxidation of Fe(II) species during the reaction, the reaction medium, i.e. methanol (MeOH) or ethanol was degassed by bubbling $N_2$ before usage and the synthesis of Fe(II) doped Zn-ZIF-8 material was conducted in a glove box as follows:

Providing an Imidazolate Precursor Preparing a Solution A:

First, 1.314 g of 2-methylimidazole (2-mIm) is provided as an imidazolate precursor and 0.076 g of potassium iodide (KI) were dissolved in 15 mL of MeOH to form solution A.

Providing Iron (II) Chloride Preparing a Solution B:

0.080 g of $FeCl_2.4H_2O$ or 0.063 g of $FeCl_2$ as a Fe(II) precursor and 1.190 g of $Zn(NO_3)_2.6H_2O$ were dissolved in 25 mL of MeOH to form solution B.

Adding Solution B into Solution a Under Stirring Under Inert Atmosphere:

Then, solution B was added into solution A dropwise under stirring at room temperature in 1 hour, and the solution became turbid and slightly yellow gradually. The mixture was kept under stirring for 1 day in $N_2$ atmosphere after the addition of solution B.

Washing and Collecting the Precipitate:

The precipitate was separated by filtration under ambient pressure in glove box and washed by DMF once and MeOH twice in sequence. Then, the washed precipitate was dried under vacuum at room temperature for 30 min and Fe(II)-doped Zn-ZIF-8 was collected as a white powder and placed in a corundum crucible and immersed in hexane to isolate the precursor with air during the transfer from the glove box to the tube furnace for pyrolysis. Fe(II) doped Zn-ZIF-8 can be stored by sealing under $N_2$ atmosphere or merged in hexane. The dry form can be stored for about one week. The obtained yield based on Zn is about 90% and about 50% of Fe loaded was doped into the ZIF.

Example 2: Preparation of a Catalytic Material of the Invention from a Fe(II) Doped Zn-ZIF A method of the invention for the preparation of a catalyst containing Fe single atoms on N doped carbon matrix obtained from a Fe(II) doped Zn-ZIF according to the invention is illustrated on FIG. 1A using the Fe(II) doped zinc imidazolate (ZIF-8) obtained in Example 1 as a precursor for pyrolysis. The Fe(II) doped zinc imidazolate (ZIF-8) precursor obtained in Exampled 1 was immersed in hexane during the transfer from glove box to the tube furnace to prevent possible oxidation caused by exposing to air. The pyrolysis is then carried out in the tube furnace with $N_2$ with a flow rate of 100 mL·min$^{-1}$ at 900° C. for 3 hours with a ramping rate of 5° C.·min$^{-1}$. The catalytic material resulting from the pyrolysis is obtained as a black powder. The obtained yield based on Fe is about 90%.

Example 3: Characterization of the Fe(II) Doped Zinc Imidazolate (ZIF-8) Precursor and its Pyrolyzed Product The X-ray diffraction (XRD) patterns of the un-doped ZIF-8 prepared with the same method in Example 1 except that $FeCl_2$ or $FeCl_2.4H_2O$ was not added and of the Fe(II) doped zinc imidazolate (ZIF-8) precursor of the invention were compared as reported on FIG. 2a. The XRD patterns of the materials obtained after pyrolysis of un-doped ZIF-8 and Fe(II) doped ZIF-8 were compared as reported on FIG. 2b. To prepare the sample for XRD characterization, the solid form of the material was first dispersed in small amount of ethanol, dropped on a glass slide and dried naturally.

The XRD measurements were conducted on an X'Pert™ Philips diffractometer with monochromatic Cu Kα radiation and a fast Si-PIN multi-strip detector.

Figure 2:
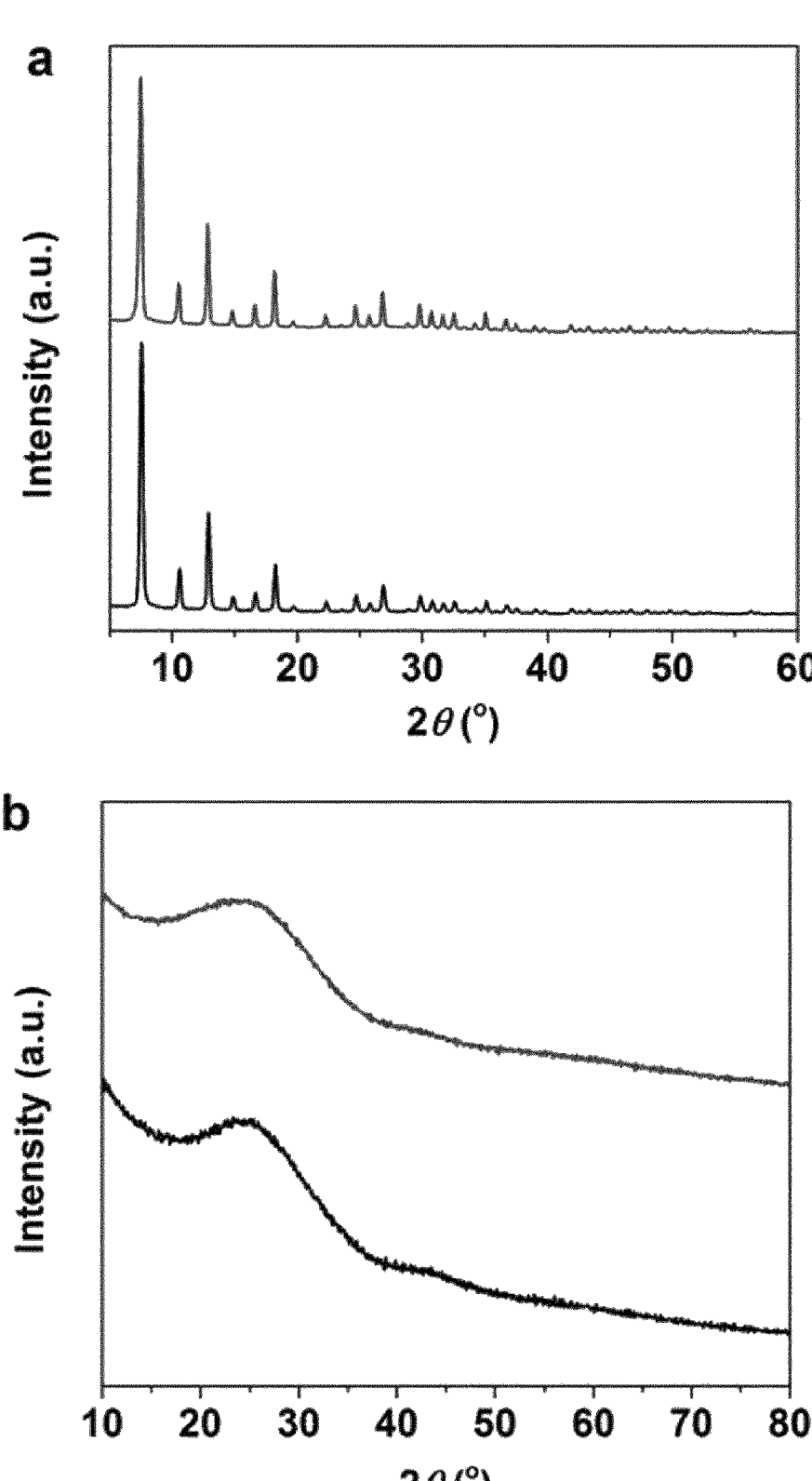
FIG. 2 provides the X-ray diffraction patterns for the precursors before pyrolysis (a) and the corresponding pyrolysis products (b) of Fe(II) doped Zn-ZIF-8 precursor (top) and non-doped Zn-ZIF-8 (bottom) and a comparison of patterns before pyrolysis (c) and after pyrolysis (d) of a comparative Fe(II) doped Co-ZIF-8 precursor (top) and of a Fe(II) doped Zn-ZIF-8 precursor of the invention (bottom), as described in Example 3.
Figure 2:
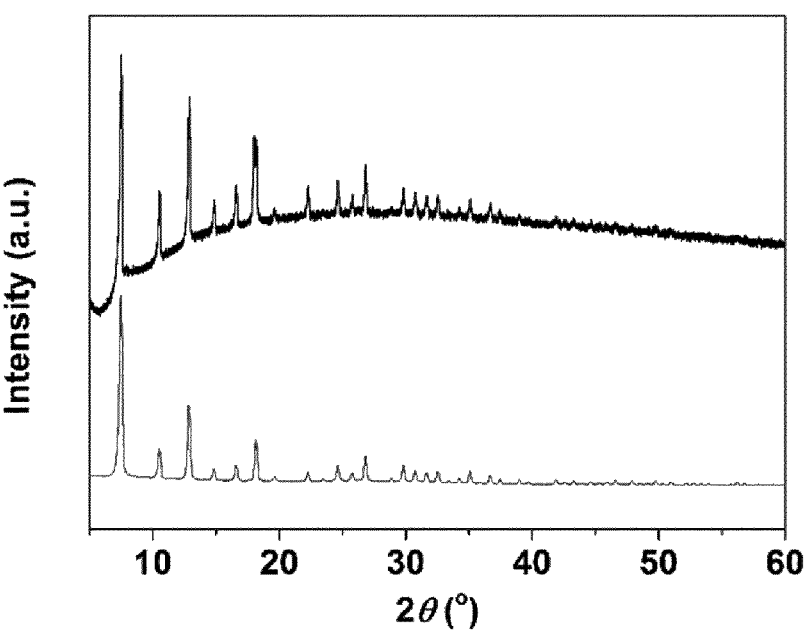
Figure 2:
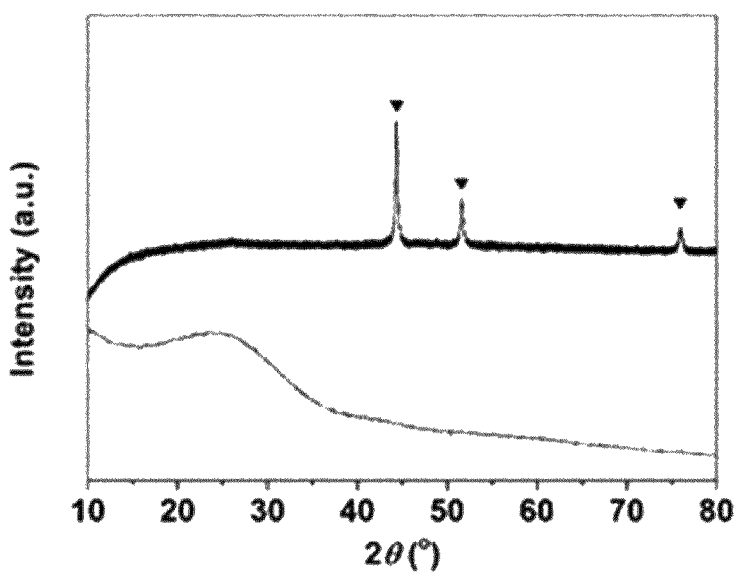
Figure 6A:
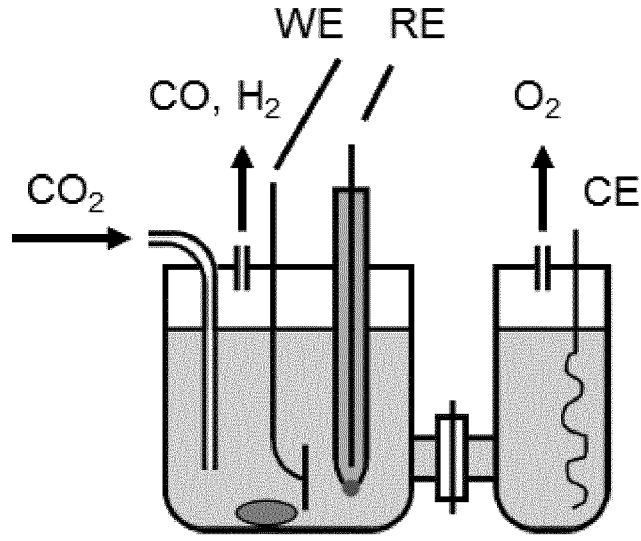
FIG. 6 presents the electrochemical characterization of the performance of the catalytic material of the invention obtained as described in Example 2, compared to other materials in an electrolysis test using 0.5 M $KHCO_3$ as electrolyte as described in Example 4. a: Schematic representation of the electrolysis test conducted in an electroreduction system for the electrochemical reduction of $CO_2$ comprising a working electrode (WE, carbon cloth with catalyst material deposited on its surface by drop-casting, as described in Example 4), a counter electrode (RE, platinum wire) and a reference electrode (RE, Ag/AgCl, saturated KCl solution electrode); b: Stable cyclic voltammetry (CV) curves obtained with the Fe—N—C(II) material of the invention and the pyrolysis product of un-doped ZIF-8 material in $CO_2$ (solid curves) and $N_2$ (dashed curves) saturated electrolyte; c: Chronoamperometry curve of the catalytic material of the invention ("Fe—N—C(II)" in $CO_2$ saturated electrolyte at –0.37 V vs RHE. Dots show the Faraday efficiencies of CO. d: Faraday efficiency of CO (bottom) and $H_2$ (top) of the Fe—N—C(II) material at different applied potentials. Comparison of Faraday efficiencies (e) and partial current densities (f) of CO on the Fe—N—C(II) material (solid curve) and other catalysts (dashed curves) at different applied potentials. (1): Fe—N—C(II) material of the invention at 0.6 mg/cm²: 3 mg of the catalyst was dispersed in 1 mL of ethanol, and 200 μL, of the dispersion was dropped on a carbon cloth electrode of 1 cm×1 cm; (2): comparative material Fe—N—C material (Fe 0.5d) from Huan et al., 2017, supra at 1 mg/cm²: 1 mg of the catalyst was dispersed to 200 μL, and dropped on a carbon paper electrode of 1 cm²; (3): comparative material CoPc/CNT from Zhang et al., 2017, *Nat. Commun.*, 8, 14675 at 0.4 mg/cm²: CoPc/CNT was prepared by the adsorption of Co phthalocyanine molecules on multi-walled carbon nanotubes in DMF. 2 mg of the catalyst was dispersed to 1 mL and 100 μL, of the dispersion was dropped on a carbon fibre paper electrode of 0.5 cm²; (4): Porous Ag from Lu et al., 2014, supra: Porous Ag electrode was prepared by acid etching of α-Al(Ag) alloy synthesized at 546° C. and (5): Oxide derived (OD) Au from Chen et al., 2012, supra: The OD Au electrode was prepared by applying symmetric 1 kHz square-wave pulses between 2.70 V and 0.70 V on Au foil in 0.5 M $H_{2504}$ electrolyte for 60 min. Faraday efficiencies of CO (solid lines) and $H_2$ (dashed lines) (g) and partial current densities (h) of CO on the Fe—N—C(II) material (squares) and other comparative Fe-doped ZIF materials (dots: Fe(II) doped Co ZIF from CN 107086313; triangles: Fe(III) doped ZIF from Ye Yifan et al, 2017, supra) at different applied potentials.

As shown on FIG. 2*a*, un-doped ZIF-8 (top) and Fe(II) doped ZIF-8 (bottom) have similar X-ray diffraction (XRD) patterns, indicating that the crystal structure of ZIF-8 did not change upon doping of Fe(II). FIG. 2*b* compares the XRD patterns of pyrolysis products obtained from the Fe(II) doped ZIF-8 precursor of the invention obtained in Example 2 (top) and obtained from the un-doped ZIF-8 under the same condition (bottom) in which broad band around 25° originated from carbon matrix was observed, and no diffraction peaks corresponding to any crystalline Fe spaces, such as metal, carbide or nitride, were shown, indicating that Fe elements existed as single-atom species in the pyrolysis product of the Fe(II) doped Zn-ZIF-8 precursor of the invention. Inductively coupled plasma-optical emission spectroscopy (ICP-OES) analysis confirmed the existence of Fe and Zn in the pyrolysis product from the Fe(II) doped Zn-ZIF-8 precursor of the invention, with the weight fractions of Fe and Zn as 2.2% and 4.3%, respectively. Comparative Fe(II) doped Co-ZIF precursors were prepared as described in CN 107086313 wherein specifically, the iron/cobalt molar ratio in the ferrous sulfate and cobalt nitrate is 0.1; the molar ratio of total metal ions to 2-methylimidazole is 1/16, the solvent is nitrogen saturated methanol, the stirring time is 5 min, temperature is 30° C.; the standing time is 20 h. For the pyrolysis, the ramping rate is 5° C./min, temperature is 900° C., standing time is 3 h and XRD patterns of this comparative precursor (top) before (FIG. 2*c*) and after pyrolysis (FIG. 2*d*) are compared to those of the Fe(II) doped Zn-ZIF-8 precursor of the invention (bottom), in the same conditions. It can be clearly seen that the comparative Fe(II) doped Co-ZIF and a Fe(II) doped Zn-ZIF of the invention show very similar XRD pattern before pyrolysis, indicating that the crystal structures of two ZIFs are similar (FIG. 2*c*). However, after pyrolysis, in the XRD pattern of the comparative Fe(II) doped Co-ZIF, the diffraction peaks of face-centered cubic Co are observed (triangles), indicating the presence of a large amount of Co crystals in the sample (FIG. 2*d*) which are pointing towards the formation of metal nanoparticles and a non-uniform doping of Fe in the material. Those Co crystals may serve as catalyst for hydrogen evolution during the process of $CO_2$ electroreduction to CO and the Faraday efficiency of CO formation would then become very low. As shown in FIG. 6*g*, for all the catalysts, the sum of the Faraday efficiency of CO and $H_2$ is approaching 100%. For the comparative catalyst derived from Fe(II) doped Co-ZIF (dots), the Faraday efficiency of $H_2$ is higher than 80%, indicating hydrogen evolution is the major process rather than CO formation during the electrolysis for this sample, as opposed to the catalyst of the invention (squares) where the Faraday efficiency of CO is higher than 80%.

Figure 3:
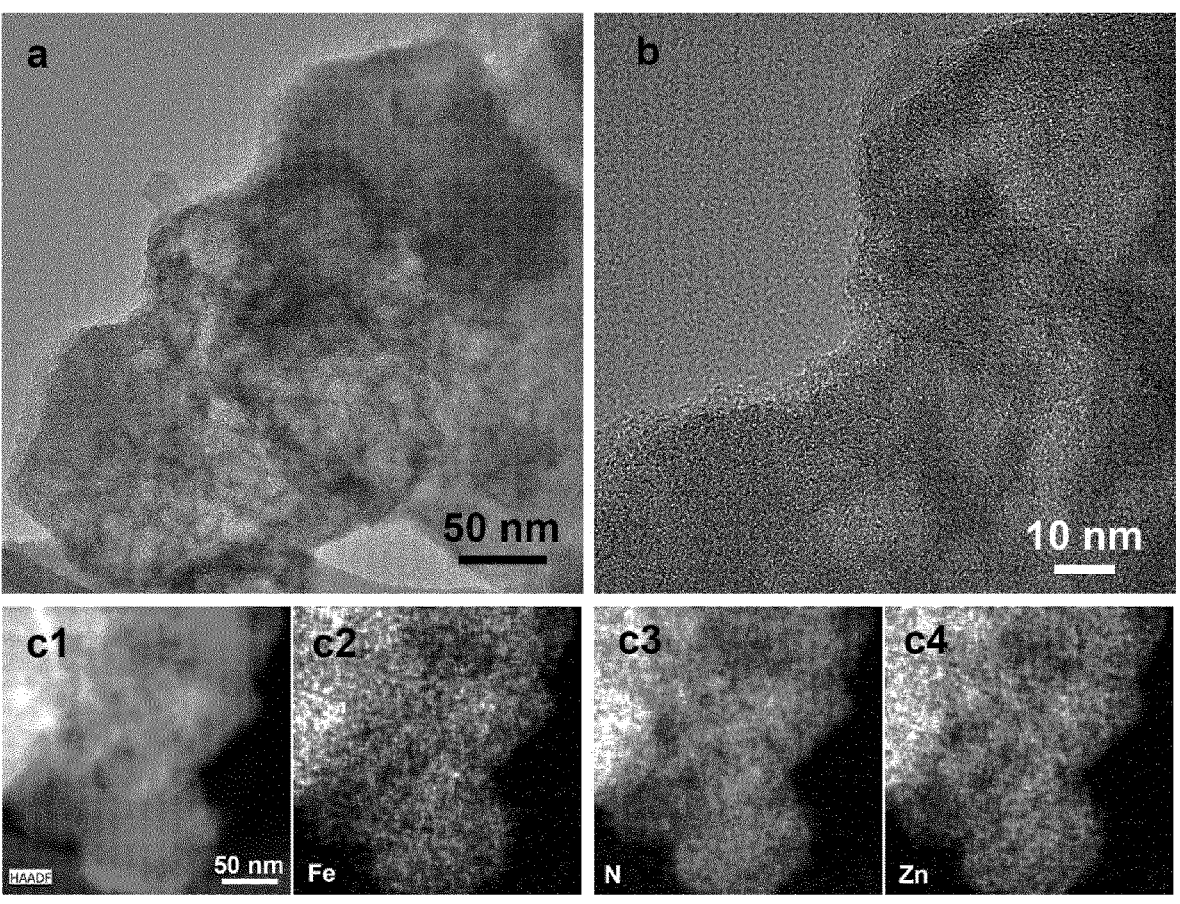
FIG. 3 provides the electron microscopic characterization by (a) transmission electron microscopy (TEM) and (b) high-resolution transmission electron microscopy (HRTEM) imaging and (c) energy dispersive spectroscopy (EDS)-mapping described in Example 3 of the catalytic material of the invention. The distributions of Fe, N and Zn are shown in c2, c3 and c4, respectively.

FIGS. 3*a* and 3*b* show TEM and HRTEM characterizations of the pyrolysis product of the Fe(II) doped Zn-ZIF-8 precursor of the invention obtained in Example 2. The material shows high porosity and no crystalline nanoparticles are observed. FIG. 3*c* show the element distributions of Fe, N and Zn obtained by EDS mapping which are homogeneous in the material.

Figure 4:
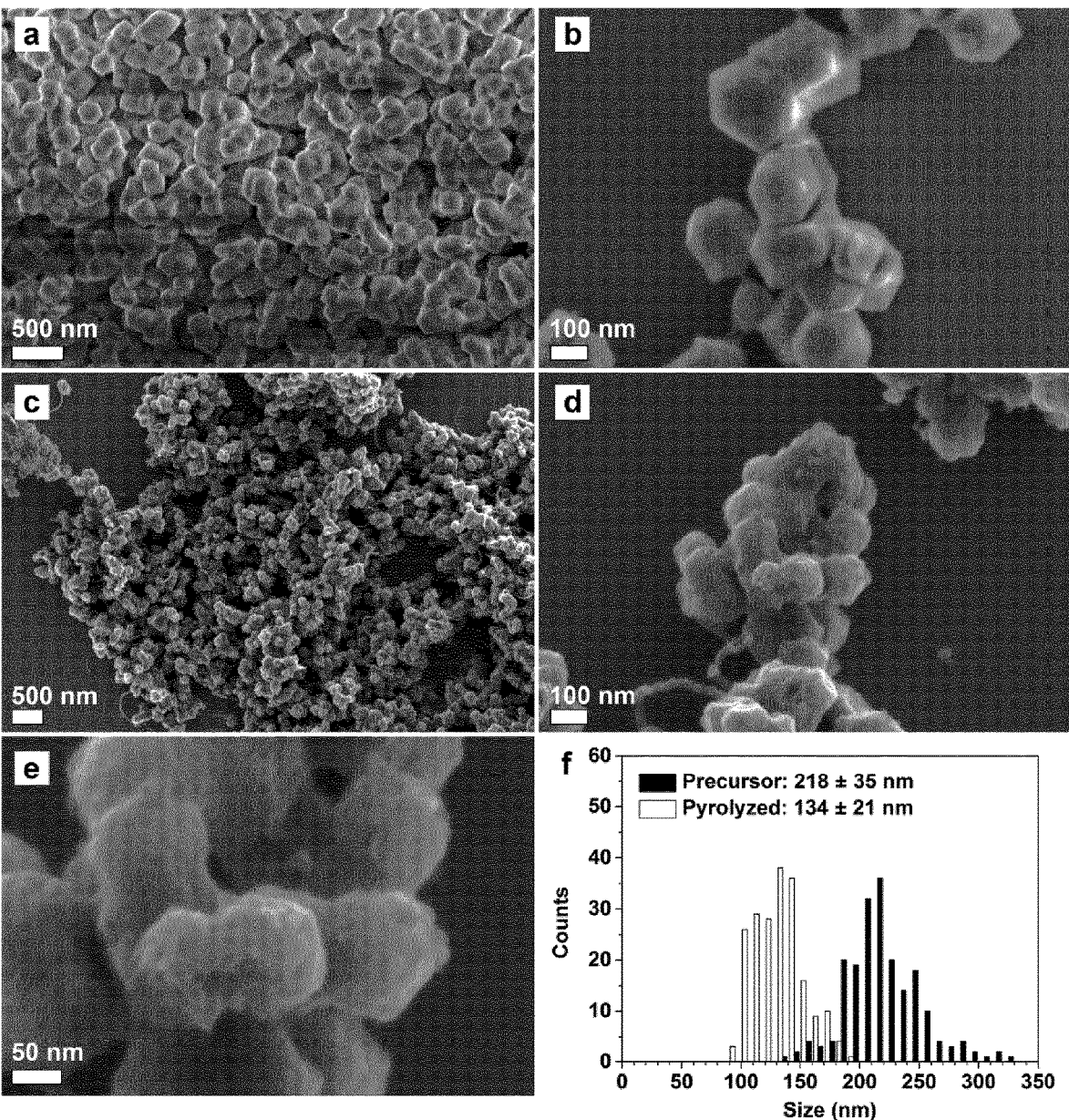
FIG. 4 provides the electron microscopic characterization by scanning electron microscopy (SEM) imaging as described in Example 3 of the catalytic material of the invention. a and b: Fe(II) doped Zn-ZIF-8 precursor before pyrolysis; c, d and e: pyrolysis product obtained from the Fe(II) doped ZIF-8 precursor; f: particle size distribution diagrams of Fe(II) doped Zn-ZIF-8 before pyrolysis (light) and pyrolysis product (dark).
Figure 5:
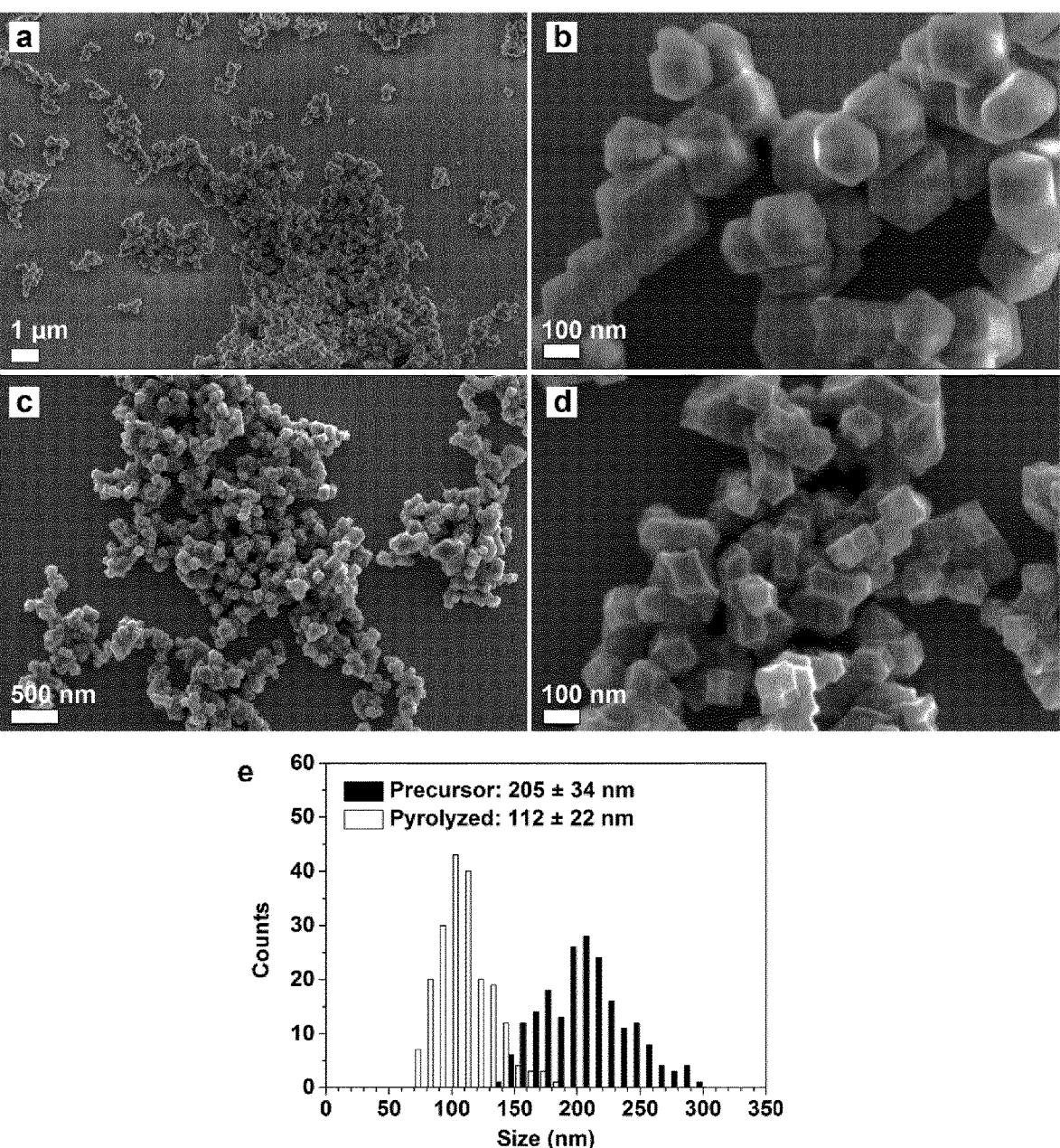
FIG. 5 provides the electron microscopic characterization by scanning electron microscopy (SEM) imaging as described in Example 3 of a comparative material (Fe—N—C(III)) prepared by the pyrolysis of Fe(III) doped ZIF-8. a and b: comparative Fe(III) doped ZIF-8 precursor before pyrolysis; c and d: pyrolysis product from the Fe(III) doped ZIF-8 precursor; e: particle size distribution diagrams of Fe(III) doped ZIF-8 before pyrolysis (light) and pyrolysis product (dark).

Further characterization of the Fe(II) doped Zn-ZIF-8 precursor obtained according to Example 1 and its pyrolysis product obtained according to Example 2 was conducted by SEM (FIG. 4) and compared to a comparative Fe(III) doped ZIF-8 and its pyrolysis product Fe—N—C(III) (FIG. 5).

Comparative Fe(III) doped ZIF-8 precursor was obtained according to a reported method (Chen, et al. 2017, *Angew. Chem. Int. Ed.*, 56, 6937-6941): First, 1.314 g of 2-mIm was dissolved in 15 mL of MeOH to form a solution A. 0.141 g of Fe(III) acetylacetonate (Fe(acac)$_3$) and 1.190 g of $Zn(NO_3)_2.6H_2O$ were dissolved in 30 mL of MeOH to form a solution B. Then, solution B was added into solution A dropwise under stirring at room temperature in 1 hour. The solution was then transferred into a 100 ml Teflon-lined stainless-steel autoclave and heated at 120° C. for 4 h. The obtained product was separated by centrifugation and washed subsequently with DMF for third and methanol for twice and finally dried at 70° C. under vacuum for overnight. The pyrolysis product of comparative Fe(III) doped ZIF-8 precursor was obtained as a black powder through pyrolysis in a tube furnace with $N_2$ flow with a flow rate of 100 mL·min$^{-1}$ at 900° C. for 3 hours with a ramping rate of 5° C.·min$^{-1}$.

As can be seen on FIG. 4, before pyrolysis (a and b), the Fe(II) doped Zn-ZIF-8 precursor material is in the form of polyhedrons with an average size of 218±35 nm and the surface is smooth. After pyrolysis (c to e), the particle size decreased to 134±21 nm and the surface of those became very rough and some nanotubes were generated. FIG. 4*f* shows the size distribution as measured from FIG. 4*a* for Fe(II) doped Zn-ZIF-8 and FIG. 4*c* for the corresponding pyrolyzed material. FIG. 5 clearly shows the SEM images of a comparative Fe(III) doped ZIF-8 precursor (a and b) and its pyrolysis product (c and d). The average particle size decreased from 205±34 nm to 112±22 nm during the pyrolysis as shown on FIG. 5*e*, where the size distributions are measured from FIG. 5*a* for Fe(III) doped ZIF-8 and FIG. 5*c* for corresponding pyrolyzed material. The surface of Fe—N—C(III) material is smoother than that of Fe—N—C(II) material after pyrolysis and no nanotube was formed.

Further characterization of the catalyst Fe(II) doped Zn-ZIF-8 material of the invention was carried out by High-angle annular dark-field scanning transmission electron microscopy (HAADF-STEM) as follows:

Atomic resolution images of a catalyst of the invention resulting from pyrolysis of a Fe(II)-doped Zn ZIF prepared as described under Example 2 was obtained on an FEI Titan Themis™ at 200 kV with spherical aberration corrected under HAADF-STEM mode. As shown on FIG. 7*a*, the bright dots are the discrete metal atoms. A spectrum obtained by Energy Dispersive X-Ray Spectroscopy (EDS) in the white square in this image supports a discrete distribution of Fe and Zn single-atom sites in the pyrolyzed sample (FIG. 7*b*).

Figure 7:
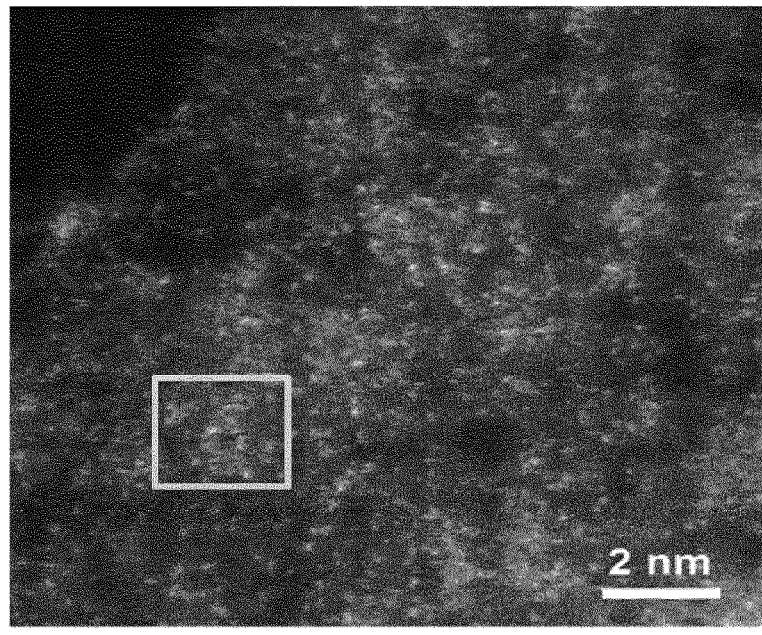
FIG. 7 provides a characterization of a Fe—N—C(II) catalyst of the invention as described in Example 3 by High-angle annular dark-field scanning transmission electron microscopy (HAADF-STEM) (a) and by Energy Dispersive X-Ray Spectroscopy (EDS) in the area indicated by the white square (b), by chronoamperometry at –0.37 V vs RHE in different electrolytes by measuring total current density (curves) and Faraday efficiency of CO (dots) with Fe—N—C(II) of the invention (c): (1) ultrapure $K_2CO_3$ (99.999%) and deionized water (18.2 MΩ·cm), (2) $KHCO_3$ with analytical-reagent purity (99.7%) and deionized water, and (3) $KHCO_3$ with analytical-reagent purity and tap water.
Figure 7:
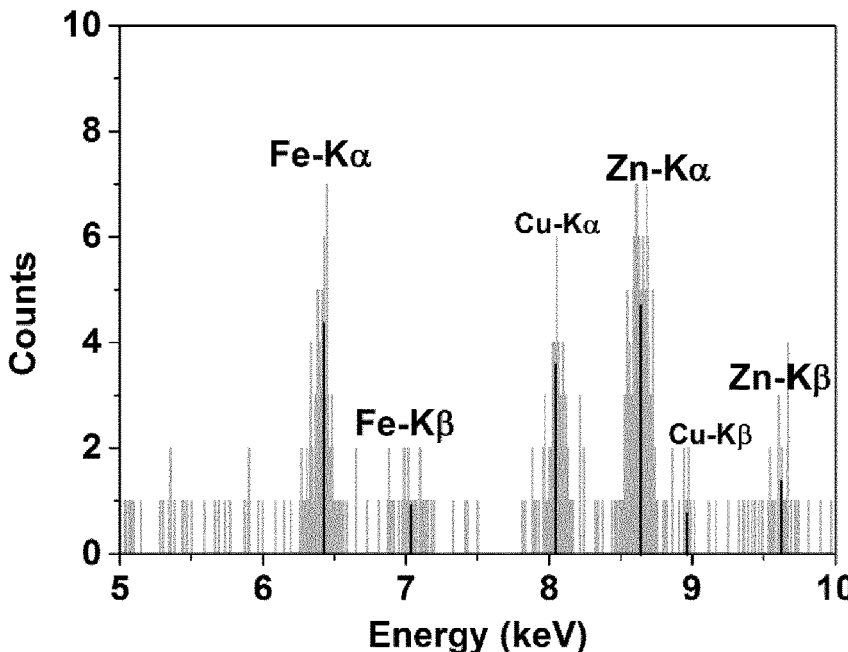
Figure 7:
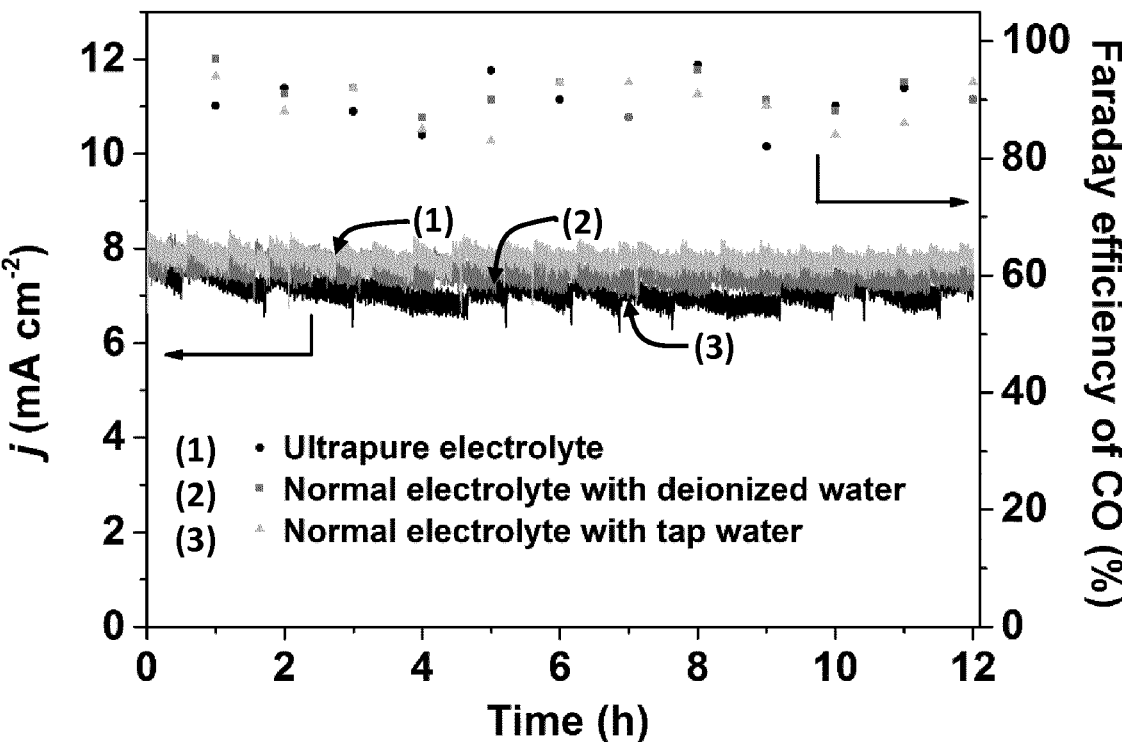

Characterization by a 12-hour chronoamperometry test (catalyst loading: 0.6 mg/cm$^2$, in $CO_2$ saturated 0.5 M $KHCO_3$ electrolyte, kept at −0.37 V vs RHE for 12 hours.) of the catalyst Fe—N—C(II) was done at −0.37 V vs RHE in electrolyte made from ultrapure $K_2CO_3$ (99.999%) and deionized water (18.2 MΩ·cm), $KHCO_3$ with analytical-reagent purity (99.7%) and deionized water, and $KHCO_3$ with analytical-reagent purity and tap water and the obtained total current density and Faraday efficiency of CO did not change significantly as the concentration of impurity in electrolyte increased and the performance was stable in 12 hours (FIG. 7*c*). For most electrocatalysts for $CO_2$ electroreduction, ultra-pure electrolyte is indispensable and the fact that a catalyst of the invention can even work in electrolyte made from tap water is a great advantage for large-scale applications.

Figure 9:
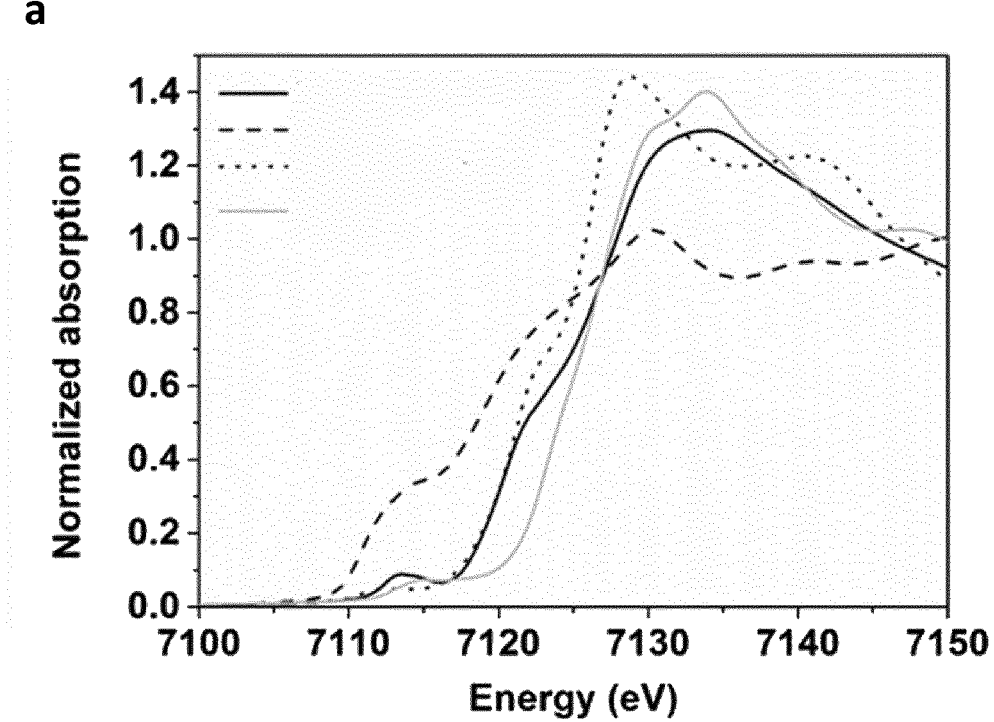
FIG. 9 provides a characterization of the precursor Fe(II) doped Zn-ZIF material (a-c) and of the catalyst material Fe—N—C(II) resulting from the pyrolysis of the Fe(II) doped material Zn-ZIF (d) by X-ray absorption spectroscopy (XAS) as described in Example 3. a: Fe K-edge XANES spectra of Fe(II) doped Zn-ZIF of the invention (black solid) compared to Fe foil (black dashed), Fe(II)(phen)$_3SO_4$ (black dots) and $Fe_2O_3$ (grey solid); b: Fe K-edge EXAFS spectrum of Fe(II) doped Zn-ZIF precursor of the invention. Black curve: fitting with the crystal structure of ZIF-8 in which the sites of Zn(II) ions were occupied by Fe(II) ions; c: Schematic representation of the structure used as a model for EXAFS fitting, in particular the region around the metal of the crystal cell of d: Fe K-edge EXAFS spectrum of a catalyst material of the invention Fe—N—C(II) resulting from the pyrolysis of Fe(II) doped Zn-ZIF precursor.
Figure 9:
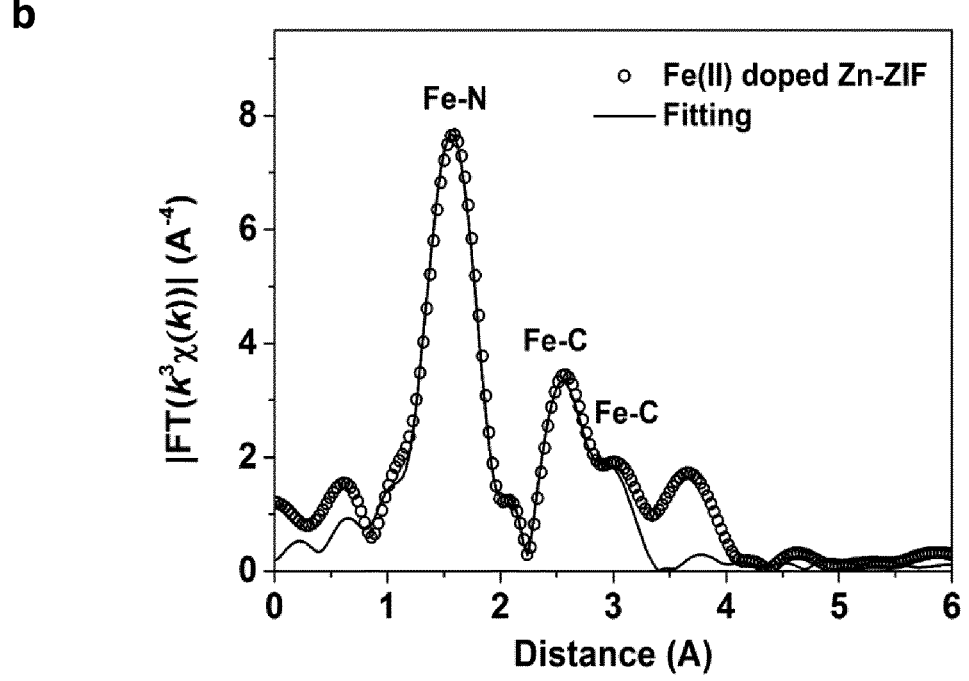
Figure 9:
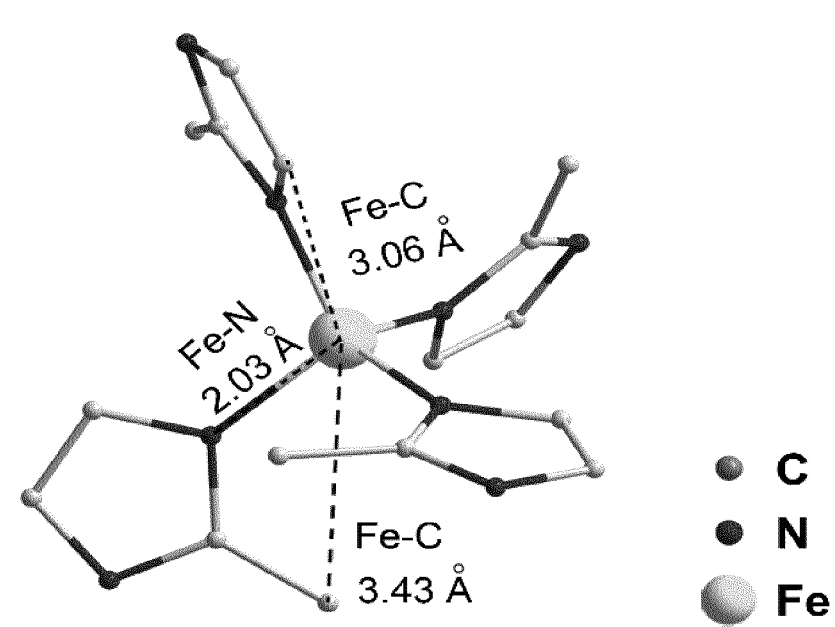
Figure 9:
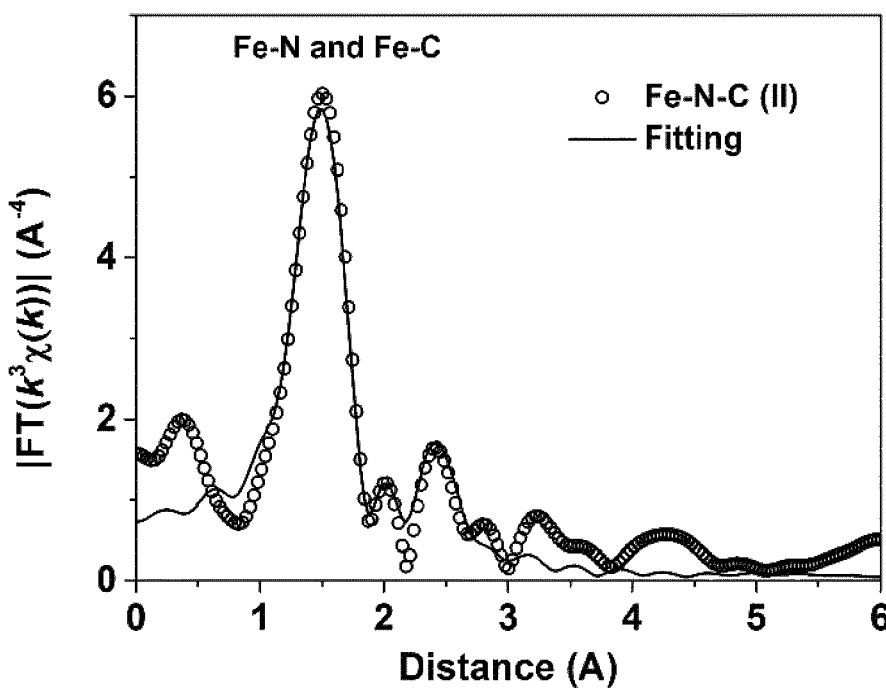

Further characterization of the precursor Fe(II) doped Zn-ZIF was carried out by X-ray absorption spectroscopy (XAS) as briefly described below:

XAS including X-ray absorption near edge spectra (XANES) and extended X-ray absorption fine structure (EXAFS) at Fe K-edge were collected in total-fluorescence-yield mode at ambient condition at BM31 beam line of the European Synchrotron Radiation Facility (ESRF). The scan range was kept in an energy range of 7000-7700 eV for Fe K-edge. Subtracting the baseline of pre-edge and normalizing that of post-edge obtained the spectra. EXAFS analysis was conducted using Fourier transform on $k^3$-weighted EXAFS oscillations to evaluate the contribution of each bond pair to Fourier transform peak. The data collected were normalized to the incoming incident energy and processed with the Athena software from the IFEFFIT package. An $E_0$ value of 7112.0 eV was used to calibrate all data with respect to the first inflection point of the absorption K-edge of an iron foil. EXAFS curve fitting was performed with Artemis and IFEFFIT software using ab initio-calculated phases and amplitudes from the program FEFF 8.2. The EXAFS equation was used to fit the experimental data using CN (coordination number), R (distance between absorber and backscatter atoms), and $\sigma^2$ (the EXAFS Debye-Waller factor to account for both thermal and structural disorders) as variable parameters. The $S_0^2$ values (amplitude reduction factor due to shake-up/shake-off processes at the central atom) was determined as 0.89. FIG. 9a shows the Fe K-edge X-ray absorption near edge structure (XANES) of a Fe(II) doped Zn-ZIF precursor as obtained under Example 1 in comparison with that of Fe foil, Fe(II)-phenanthroline sulfate (Fe(phen)$_3$SO$_4$) and Fe$_2$O$_3$. Those data show that the energy of a Fe K-edge of Fe(II) doped Zn-ZIF of the invention is close to that of Fe(phen)$_3$SO$_4$, indicating Fe here shows a +2 valence. FIG. 9b shows the Fe K-edge extended X-ray absorption fine structure (EXAFS) of a Fe(II) doped Zn-ZIF precursor as obtained under Example 1. The fitting was based on the crystal structure of ZIF-8 in which Zn(II) ions were substituted by Fe(II) ions (FIG. 9c) and bond length and coordination numbers are let free. The first-shell Fe—N path and the second- and third-shell Fe—C paths were fitted. The lengths of the Fe—N and the two Fe—C paths from the fitting are 2.03±0.01 Å, 3.06±0.02 Å and 3.43±0.03 Å, respectively, close to the distances of Zn—N (2.00 Å), Zn—C (3.02 Å) and Zn—C (3.42 Å) in undoped Zn-ZIF-8 crystal. The coordination numbers (CNs) of these three paths from the fitting are 4.4±0.4, 6.5±0.6 and 3.3±0.7, respectively, also comparable to the ideal values (4, 8 and 4, respectively) for a perfect ZIF-8 crystal. These results indicate the formation of Fe doped Zn-ZIF-8 with part of Zn(II) ions substituted by Fe(II) ions.

FIG. 9d shows the Fe K-edge EXAFS spectrum of the catalyst after pyrolysis of Fe(II) doped Zn-ZIF, which only shows the Fe—N and Fe—C paths in the first shell coordination with the lengths of 1.99±0.01 Å and 1.94±0.03 Å, respectively, and the CNs of 3.7±0.4 and 0.5±0.1, respectively. The Fe—N and Fe—C path length and coordination number from the EXAFS fitting and the theoretical values of ZIF-8 crystals are close which, together with the observed similar XRD patterns (Figure supports that the Fe(II) doped ZIF-8 according to the invention has crystal structure similar to ZIF-8, and part of the Zn(II) ions are substituted by Fe(II) ions.

These results indicate Fe appears as discrete single atoms coordinated with about 4 X (X=N or C) atoms in this catalyst.

Example 4: Electrochemical Characterization of the Catalytic Material of the Invention The performances of as a catalyst for CO$_2$ reduction have been tested for the pyrolysis material prepared from a Fe(II)-doped Zn-zeolitic imidazole framework (ZIF) according to the invention in an electroreduction system as follows: To prepare a catalyst ink, 3 mg of the material and 40 μL of Nafion® perfluorinated resin solution (5 wt. %, Sigma) were dispersed in 1 mL of ethanol by ultrasonic treatment for 30 min. Belt-shape carbon cloth (Fuel Cell Store) was used as the working electrode. The area exposed to the electrolyte was fixed at 1 cm$^2$ by shading the carbon cloth by sealing film. 200 μL of catalyst ink was loaded on the carbon cloth by drop-drying in 4 times. Thus, the loading of catalyst on carbon cloth was 0.6 mg·cm$^{-2}$. Nafion® was used to bind the material to the carbon cloth electrode. Electrochemical characterizations were carried out in an electroreduction system in the form of a Gamry Reference 3000 electrochemical instrument using an air-tight two-chamber cell as schematized on FIG. 6a. Working and reference electrodes were fixed in one chamber and counter electrode in the other one. The two chambers were separated by an anion exchange membrane (Fumasep® FAA-3-PK-130). Ag/AgCl electrode with saturated KCl filling solution and Pt wire were used as reference and counter electrodes, respectively. 0.5 M KHCO$_3$ aqueous solution was used as the electrolyte in the chamber of the working electrode and was stirred vigorously during the experiments. The working electrode side was bubbled with CO$_2$ or N$_2$ for at least 30 min to get the electrolyte saturated. The inlet gas was pre-humidified by 0.5 M KHCO$_3$ solution to minimize the evaporation of the electrolyte.

Figure 6B:
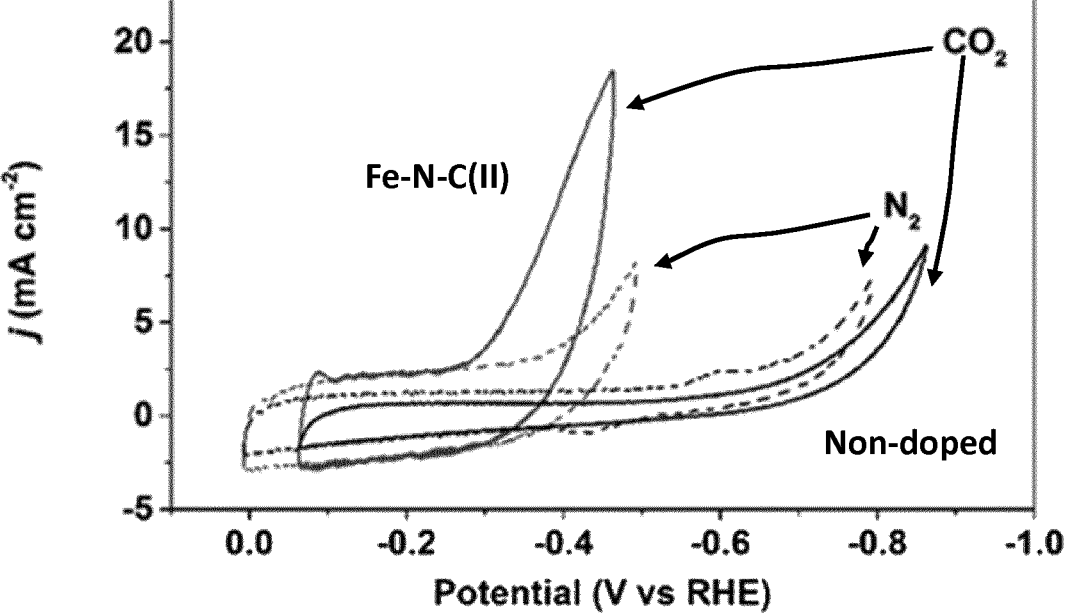
Figure 6C:
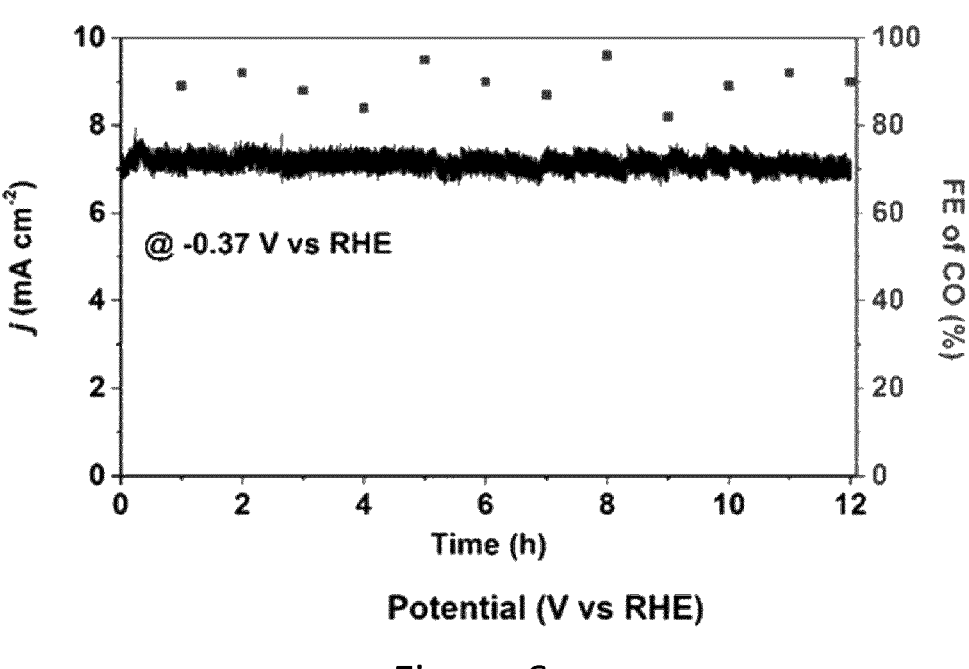
Figure 6D:
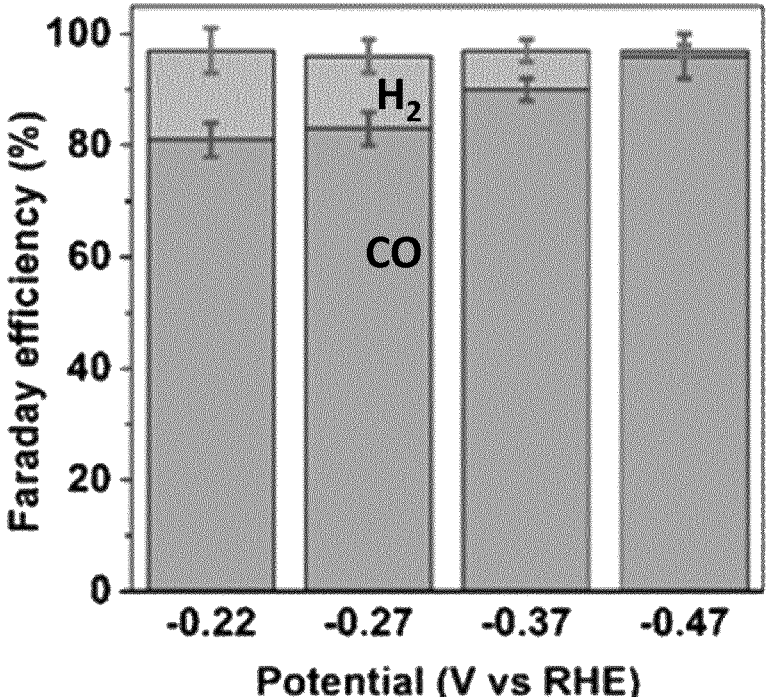
Figure 6E:
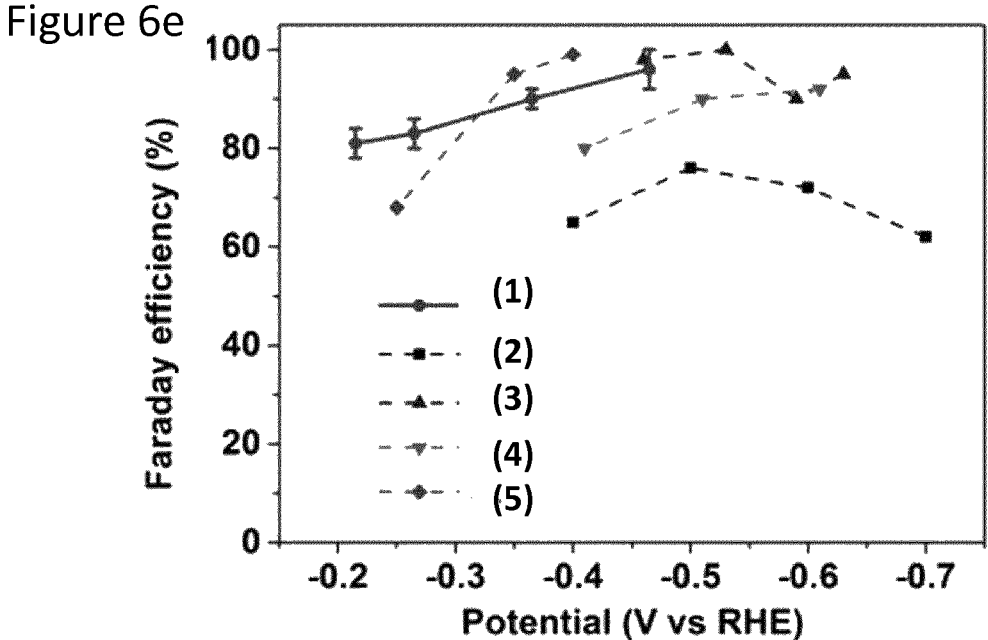
Figure 6F:
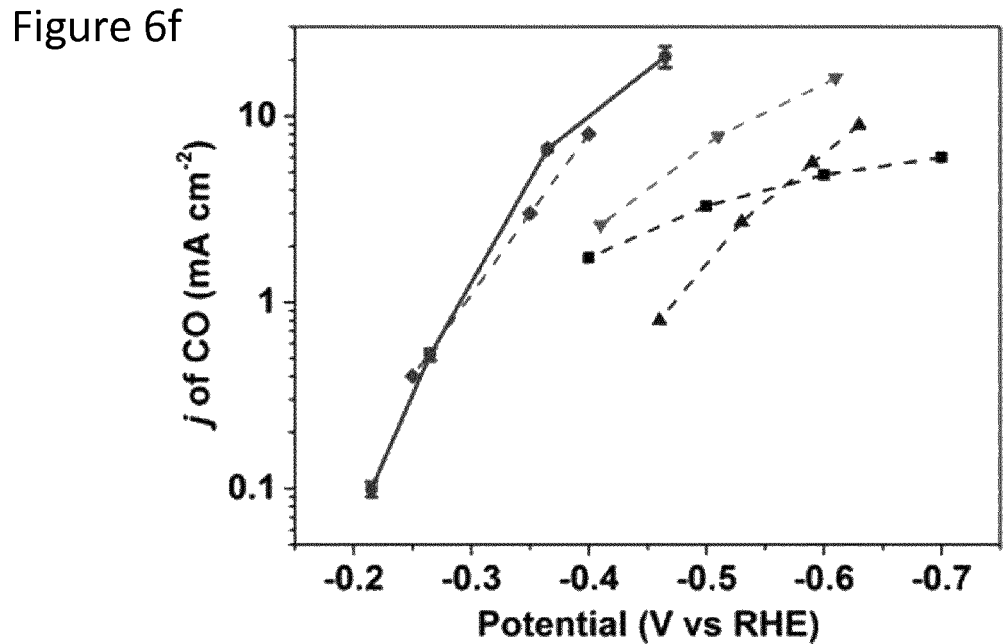
Figure 6G:
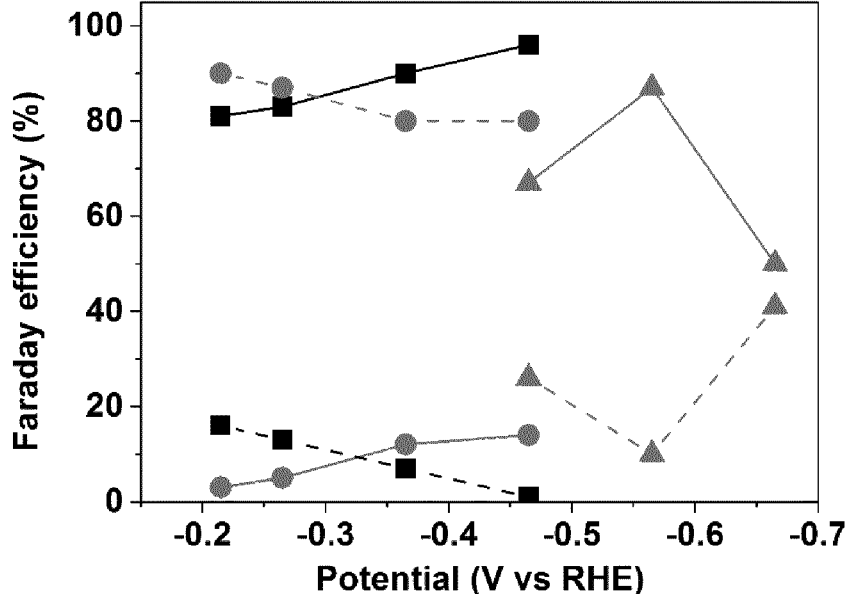
Figure 6H:
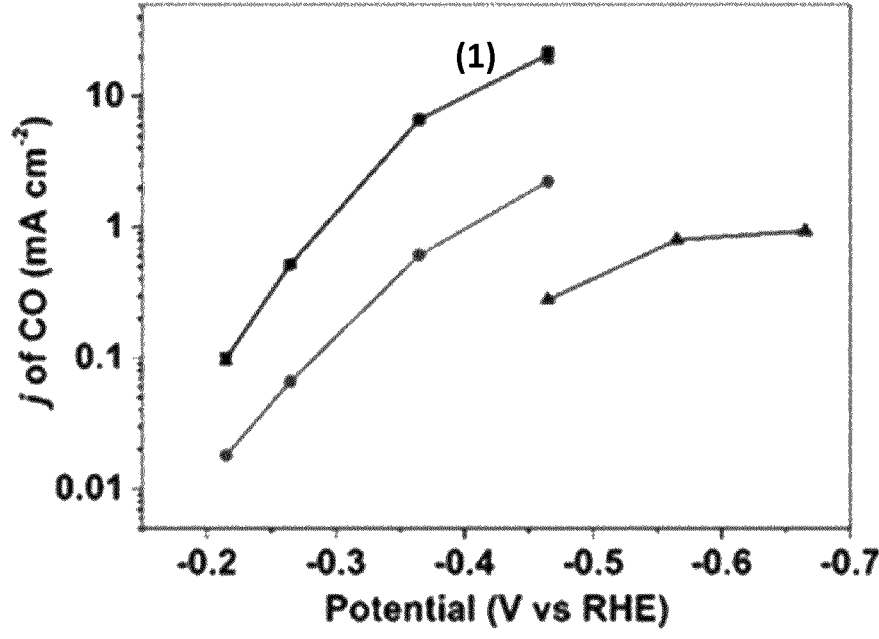

FIG. 6b compares the cyclic voltammetry (CV) curves of the pyrolysis products of Fe(II)-doped Zn-ZIF-8 and of un-doped ZIF-8 (obtained by pyrolysis according to the procedure described in Example 2) in N$_2$ and CO$_2$ saturated electrolyte. The catalytic material of the invention shows significantly increased current density in CO$_2$ saturated electrolyte between −0.25 V and −0.5 V vs RHE, and much higher than that of pyrolysis product of un-doped ZIF-8, implying Fe single atom sites may exhibit CO$_2$ reduction ability in this potential range. FIG. 6c shows the chronoamperometry curve of the material of the invention in CO$_2$ saturated electrolyte at −0.36 V vs RHE. The current density kept constantly at about 7 mA·cm$^2$. CO, and very small amount of H$_2$, were the only product detected by gas chromatography (GC) and no product in solution phase was detected by H$^1$-nuclear magnetic resonance (H$^1$-NMR), supporting the high specificity of the reaction. The Faraday efficiency of CO kept above 80% during this 1-day electrolysis. FIG. 6d shows the Faraday efficiency of CO and H$_2$ of the Fe—N—C(II) material of the invention at different applied potentials. It can be seen that the Faraday efficiency of CO was higher than 80% between −0.21 V and −0.46 V vs RHE. FIGS. 6e and 6f compare the Faraday efficiency and partial current density of CO formation, respectively, of the Fe—N—C(II) material of the invention and some recently reported catalysts with the highest CO formation activity. Surprisingly, the Fe—N—C(II) material shows comparable partial current density of CO formation with oxide derived Au (OD Au), one of the most active catalysts for CO formation in literatures (Chen et al., 2012, supra) at a certain applied potential, and significantly higher than that of other earth abundant metal based catalysts, namely the best Fe—N—C(III) material described in Huan et al., 2017, supra (Fe 0.5d), CoPc/CNT material described in Zhang, et al., 2017, supra and Porous Ag material described in Lu, et al., 2014, supra. Similarly, the Faraday efficiencies of a comparative Fe(II) doped Co ZIF and a comparative Fe(III) doped ZIF are respectively very low and significantly lower than those of a Fe(II) doped Zn-ZIF of the invention and the partial current densities are also significantly lower for the two comparative materials over those of a Fe(II) doped Zn-ZIF (FIGS. 6g and h).

Figure 8:
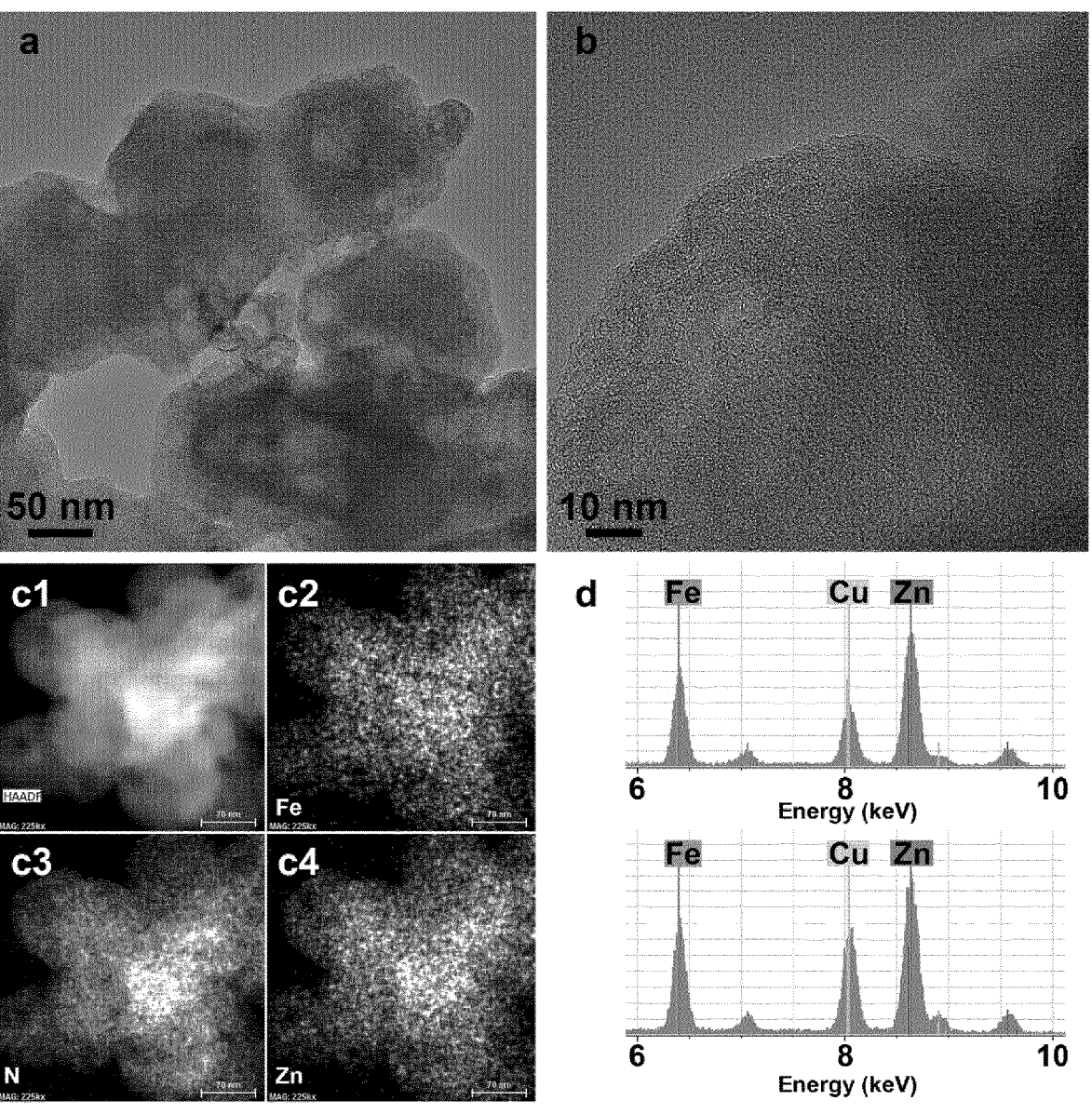
FIG. 8 provides the electron microscopic characterization by (a) transmission electron microscopy (TEM) and (b) high-resolution transmission electron microscopy (HRTEM) imaging, (c) EDS-mapping of the material of the invention after electrolysis as described in Example 5. The distributions of Fe, N and Zn are shown in c2, c3 and c4, respectively and (d) EDS spectra Fe—N—C(II) material before (top) and after (bottom) electrolysis.

Example 5: Characterization of the Pyrolyzed Product of Fe(II) Doped Zinc Imidazolate (ZIF-8) Precursor after Electrolysis The stability of the catalytic material of the invention was assessed by electron microscopy as described under Example 3 carried out after the electrolysis test conducted as described in Example 4 (FIG. 8). After the electrolysis, the carbon cloth electrode was rinsed with deionized water and immerged in 0.5 mL of ethanol. A dispersion of the catalyst after electrolysis was obtained after ultrasound treatment for about 1 h, which was then used for electron microscopy characterizations. It can be seen that no segregation of Fe single atoms to form nanoparticles was observed in the catalytic material of the invention, as indicated by the TEM and HRTEM images (FIGS. 8a and 8b, respectively). The EDS-mapping result (FIG. 8c) still shows high dispersity of Fe (c2), Zn (c3) and N (c4) on carbon matrix and the EDS spectra of catalytic material of the invention ("Fe—N—C (II)") before (top) and after electrolysis (bottom) show similar Fe:Zn ratios (39:61 and 43:57, respectively) (FIG. 4d), indicating high stability of the catalytic material of the invention during $CO_2$ electroreduction.

In summary, the catalytic material comprising single-atoms Fe dispersed on N-doped carbon matrix obtained through the pyrolysis of Fe(II) doped Zn-ZIF-8 shows high selectivity and activity to CO formation in $CO_2$ electrore-duction in an aqueous electrolyte. The obtained Faraday efficiency of CO was higher than 80% and the partial current density of CO was comparable to that of OD Au at low overpotential region, which is one of the most active catalysts for CO reduction ever reported (Chen et al., 2012, supra). Due to its high activity of CO formation and the high abundance of Fe, this material is a promising catalyst used in the practical conversion of $CO_2$ to CO and other chemicals.

The invention claimed is:

1. A method for the preparation of a Fe(II)-doped Zn-ZIF material comprising the steps of:
   (i) providing an imidazole or imidazole derivative precursor;
   (ii) dissolving the said imidazole or imidazole derivative precursor in degassed non-aqueous polar solvent, in a reductive environment to prevent the oxidation of $Fe^{2+}$ cations to obtain a solution A;
   (iii) dissolving an iron (II) precursor and a Zn salt in degassed non-aqueous polar solvent to obtain a solution B;
   (iv) adding solution B into solution A;
   (v) collecting and washing the precipitate; and
   (vi) leaving the washed precipitate drying at room temperature to obtain a unsupported Fe(II)-doped Zn-zeolitic imidazole framework (ZIF) in the form of a dry powder, wherein steps (ii) and (iv) are conducted under stirring and step (iv) is conducted in an inert atmosphere, wherein the reductive environment is achieved by the introduction of at least one reductive agent being an iodide derivative, and wherein the obtained Fe(II)-doped Zn-ZIF material is essentially free from Fe(III).

2. The method according to claim 1, wherein solution B is added into solution A dropwise under stirring for about 1 hour under step (iv).

3. The method according to claim 1, wherein the reacting mixture from step (iv) is kept under stirring under inert atmosphere for about one day after the completion of the addition of solution B.

4. The method according to claim 1, wherein said imidazole precursor is 2-methyl imidazole.

5. The method according to claim 1, wherein said iron (II) precursor is $FeCl_2$.

6. The method according to claim 1, wherein the precipitate is collected under step (v) by ambient-pressure filtration or centrifugation under inert atmosphere.

7. The method according to claim 1, wherein the reductive environment is achieved by the introduction of at least one iodide derivative selected from potassium iodide, sodium iodide, or ammonium iodide.

8. The method according to claim 1, wherein the polar non-aqueous solvent is selected from methanol and ethanol.

9. The method according to claim 1, said method further comprising:
   subjecting the unsupported Fe(II)-doped Zn-zeolitic imidazole framework (ZIF) to pyrolysis under inert atmosphere for about 2 to about 24 hours; and
   collecting the pyrolysis product.

10. The method according to claim 8, wherein the polar non-aqueous solvent is methanol.

11. The method according to claim 8, wherein the polar non-aqueous solvent is ethanol.

12. The method according to claim 9, said method comprising subjecting said Fe(II)-doped Zn-ZIF to a pyrolysis under inert atmosphere for about 3 hours and collecting the obtained pyrolysis product as a catalyst material.

13. The method according to claim 9, wherein the pyrolysis is carried out at a temperature between about 800 and 950° C.

14. The method according to claim 9, wherein the pyrolysis is carried out by ramping temperature at a rate of about 3 to 10° C. min$^{-1}$.

15. The method according to claim 9, wherein the inert atmosphere is a $N_2$ flow.

16. The method according to claim 9, wherein said Fe(II)-doped Zn-ZIF has a crystal structure of Zn-ZIF-8 wherein some Zn(II) ions are substituted by Fe(II) ions.

17. The method according to claim 12, wherein the pyrolysis is carried out at a temperature between about 800 and 950° C.

18. The method according to claim 12, wherein the pyrolysis is carried out by ramping temperature at a rate of about 3 to 10° C. min$^{-1}$.

19. The method according to claim 12, wherein the inert atmosphere is a $N_2$ flow.

20. The method according to claim 12, wherein said Fe(II)-doped Zn-ZIF has a crystal structure of Zn-ZIF-8 wherein some Zn(II) ions are substituted by Fe(II) ions.

* * * * *